United States Patent
Choi et al.

(10) Patent No.: US 12,050,734 B2
(45) Date of Patent: Jul. 30, 2024

(54) ELECTRONIC DEVICE FOR PROVIDING VISUAL EFFECT CORRESPONDING TO GESTURE INPUT AND OPERATING METHOD THEREOF

(71) Applicant: SAMSUNG ELECTRONICS CO., LTD., Suwon-si (KR)

(72) Inventors: Yoonjung Choi, Suwon-si (KR); Jiyoung Kang, Suwon-si (KR); Yeonhee Rho, Suwon-si (KR); Stephanie Ahn, Suwon-si (KR); Jina Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/822,850

(22) Filed: Aug. 29, 2022

(65) Prior Publication Data

US 2022/0413621 A1 Dec. 29, 2022

Related U.S. Application Data

(63) Continuation of application No. PCT/KR2021/001986, filed on Feb. 16, 2021.

(30) Foreign Application Priority Data

Feb. 27, 2020 (KR) ........................ 10-2020-0024163

(51) Int. Cl.
*G06F 3/0484* (2022.01)
*G06F 3/01* (2006.01)
*G06F 3/14* (2006.01)

(52) U.S. Cl.
CPC ............ *G06F 3/017* (2013.01); *G06F 3/0484* (2013.01); *G06F 3/14* (2013.01)

(58) Field of Classification Search
None
See application file for complete search history.

(56) References Cited

U.S. PATENT DOCUMENTS

| 10,346,541 | B1 | 7/2019 | Phillips et al. |
| 2014/0055554 | A1* | 2/2014 | Du .................... G06V 40/175 |
| | | | 348/14.07 |

(Continued)

FOREIGN PATENT DOCUMENTS

| KR | 10-2011-0012491 A | 2/2011 |
| KR | 10-2011-0025719 A | 3/2011 |

(Continued)

OTHER PUBLICATIONS

International Search Report and Written Opinion of the International Searching Authority dated May 21, 2021, in connection with International Application No. PCT/KR2021/001986, 9 pages.

*Primary Examiner* — Rinna Yi

(57) ABSTRACT

Embodiments of the present disclosure describe an electronic device for providing a visual effect corresponding to a gesture input. The electronic device includes a sensor, a wireless communication circuit, a display device, and at least one processor. The at least one processor is configured to sense a gesture input through the sensor. The at least one processor is also configured to control the display device to display a first visual effect corresponding to the gesture input. When information related to the first visual effect is received from another electronic device through the wireless communication circuit, the at least one processor is configured to update the first visual effect displayed on the display device to a second visual effect.

10 Claims, 29 Drawing Sheets

(56) References Cited

U.S. PATENT DOCUMENTS

| | | | |
|---|---|---|---|
| 2014/0354536 A1 | 12/2014 | Kim | |
| 2016/0073017 A1* | 3/2016 | Ogasawara | H04N 23/611 463/31 |
| 2016/0210023 A1* | 7/2016 | Kim | G06F 3/011 |
| 2016/0313877 A1 | 10/2016 | Ha et al. | |
| 2017/0090582 A1* | 3/2017 | Ganesan | G06F 40/177 |
| 2017/0336926 A1 | 11/2017 | Chaudhri et al. | |
| 2017/0336960 A1* | 11/2017 | Chaudhri | H04L 51/18 |
| 2019/0207987 A1* | 7/2019 | Ahn | G06V 40/20 |

FOREIGN PATENT DOCUMENTS

| | | |
|---|---|---|
| KR | 10-2011-0025720 A | 3/2011 |
| KR | 10-1179465 B1 | 9/2012 |
| KR | 10-2018-0072136 A | 6/2018 |
| KR | 10-2073827 B1 | 2/2020 |

* cited by examiner

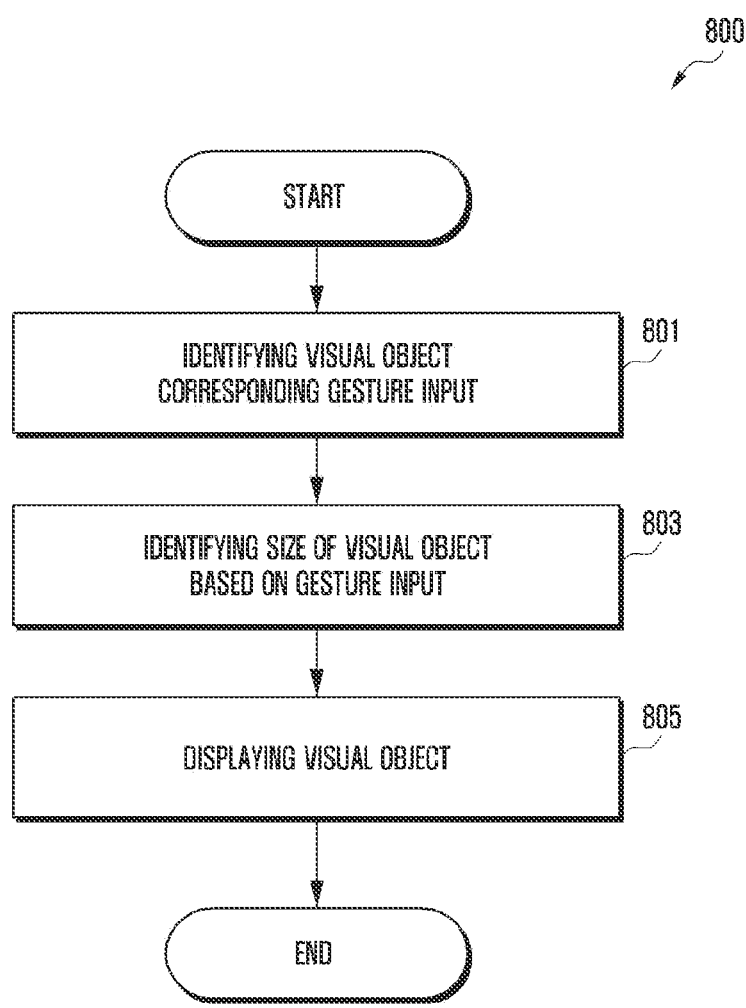

ELECTRONIC DEVICE FOR PROVIDING VISUAL EFFECT CORRESPONDING TO GESTURE INPUT AND OPERATING METHOD THEREOF

CROSS-REFERENCE TO RELATED APPLICATIONS

This application is a bypass continuation of International Application No. PCT/KR2021/001986 filed Feb. 16, 2021, which claims priority to Korean Patent Application 10-2020-0024163 filed Feb. 27, 2020, the disclosures of which are herein incorporated by reference in their entirety.

BACKGROUND

1. Field

Various embodiments of the present disclosure relate to a device and method for providing a visual effect corresponding to a gesture input in an electronic device.

2. Description of Related Art

With the growth of information telecommunication technologies and semiconductor technologies, various electronic devices are developing into multimedia devices providing various multimedia services. The multimedia service can include at least one of a voice call service, a message service, a broadcasting service, a wireless Internet service, a camera service, an electronic payment service and a music play service.

An electronic device may support a chat service between users through a communication application program such as a messenger or a video call.

An electronic device may display information (e.g., text or icon) input by a user and/or information (e.g., text or icon) received from another electronic device on at least a portion of a display device in providing a chat service.

As the use of chat services increases, an electronic device uses various input methods of chat services to satisfy various needs of users.

Various embodiments of the present disclosure disclose a device and method for providing a visual effect corresponding to a gesture input in an electronic device.

SUMMARY

According to various embodiment, an electronic device includes a sensor module, a wireless communication circuit, a display device, and at least one processor operatively connected to the sensor module, the wireless communication circuit, and the display device, the at least one processor may sense a gesture input through the sensor module, may control the display device to display a first visual effect corresponding to the gesture input, and may control the display device to update the first visual effect displayed on the display device to a second visual effect when receiving information related to the first visual effect from another electronic device through the wireless communication circuit.

According to various embodiments, A method for operating an electronic device may include operations of sensing a gesture input through a sensor module of an electronic device, displaying a first visual effect corresponding to the gesture input, and updating the first visual effect to a second visual effect when information related to the first visual effect is received from another electronic device.

According to various embodiment, an electronic device includes a wireless communication circuit, a display device, and at least one processor operatively connected to the wireless communication circuit and the display device, the at least one processor may control the display device to display a first visual effect when receiving information related to the first visual effect from another electronic device through the wireless communication circuit, and to update the first visual effect displayed on the display device to a second visual effect when receiving the information related to the first visual effect from the other electronic device through the wireless communication circuit.

According to various embodiments of the present disclosure, an electronic device may provide a visual effect corresponding to a gesture input in providing a chat service, so that a user may be provided various input methods for a chat service.

According to various embodiments, when the same visual effect overlaps in a chat service, an electronic device may provide various visual effects for a chat service by changing the shape of a corresponding visual effect.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a flowchart for setting a size of a visual object based on a gesture input in an electronic device according to various embodiments of the present disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in detail with reference to the accompanying drawings.

Figure 1:
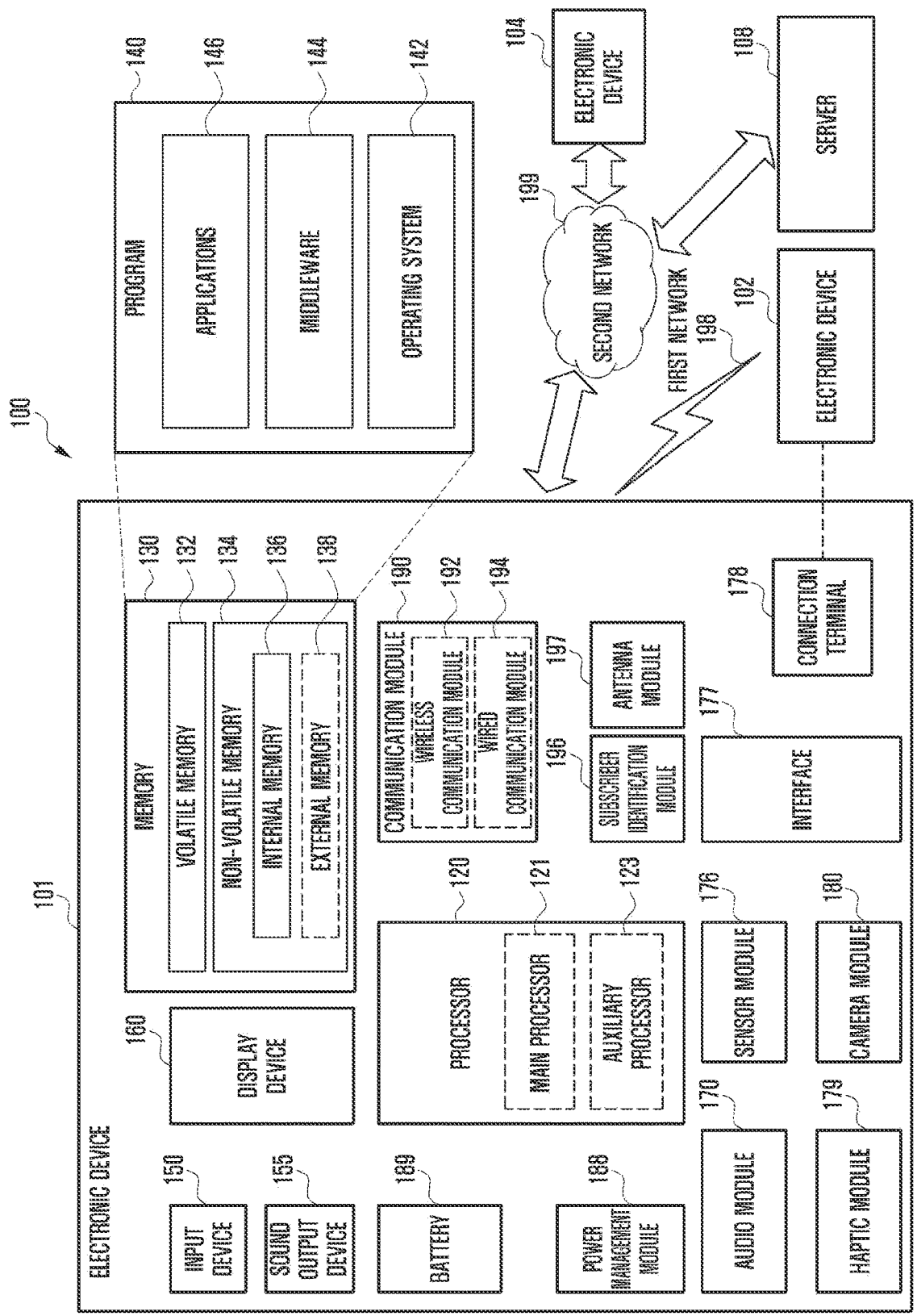
FIG. 1 illustrates a block diagram of an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
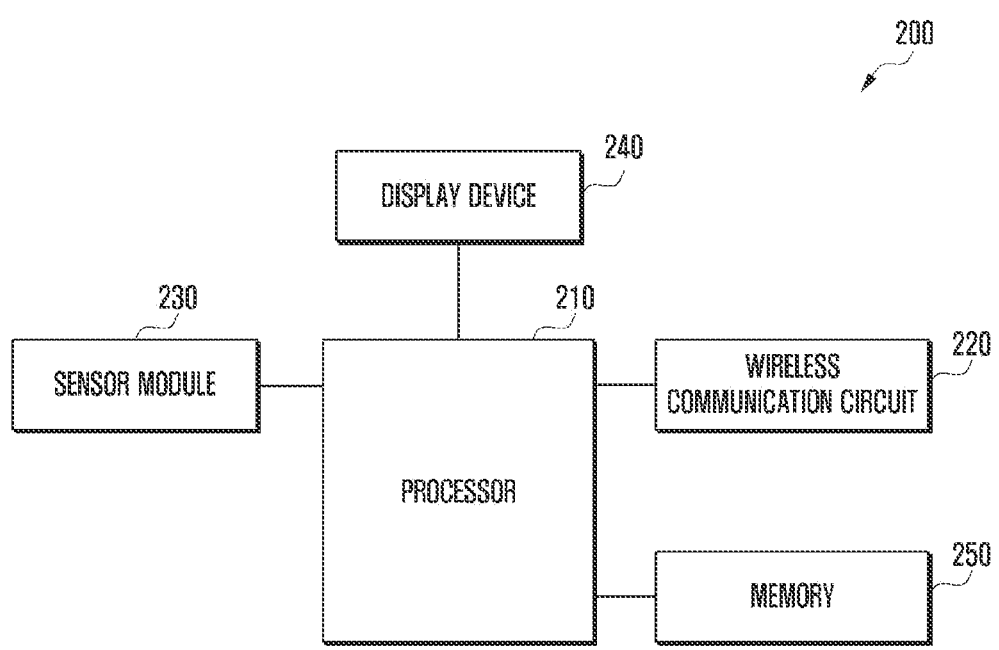
FIG. 2 illustrates a block diagram of an electronic device for providing a visual effect corresponding to a gesture input according to various embodiments of the present disclosure.

FIG. 2 illustrates a block diagram of an electronic device for providing a visual effect corresponding to a gesture input according to various embodiments of the present disclosure. For example, an electronic device 200 in FIG. 2 may be the electronic device 101 in FIG. 1.

With reference to FIG. 2, according to various embodiments, the electronic device 200 may include a processor 210, a wireless communication circuit 220, a sensor module 230, a display device 240, and/or a memory 250. According to an embodiment, the processor 210 may be the same as the processor 120 in FIG. 1 or may be included in the processor 120. The wireless communication circuit 220 may be the same as the wireless communication module 192 in FIG. 1, or may be included in the wireless communication module 192. The sensor module 230 may be the same as the sensor module 176 in FIG. 1 or may be included in the sensor module 176. The display device 240 may be the same as the display device 160 in FIG. 1 or may be included in the display device 160. The memory 250 may be the same as the memory 130 in FIG. 1 or may be included in the memory 130.

According to various embodiments, the processor 210 may control the wireless communication circuit 220, (such as a transmitter, a receiver, and/or a transceiver) so that the electronic device 200 provides a chat service. According to an embodiment, in receiving user's input information related to a chat service, the processor 210 may control the wireless communication circuit 220 to transmit and/or receive information related to the chat service to/from another electronic device (e.g., the electronic device 102 or 104 in FIG. 1). For example, the user's input information may include input information related to the execution of an application program for providing a chat service. For example, a chat service may include at least one of a messenger service and a video call.

According to various embodiments, the processor 210 may control the sensor module 230 based on a chat service to which the electronic device 200 is connected. According to an embodiment, the processor 210 may control the sensor module 230 to be activated for sensing a gesture input when the electronic device 200 is connected to a chat service in which at least one other electronic device (e.g., the electronic device 102 or 104 in FIG. 1) participates.

According to various embodiments, the processor 210 may control the display device 240 to display a visual effect corresponding to a gesture input sensed through the sensor module 230 in providing a chat service. According to an embodiment, the processor 210 may select a visual effect corresponding to a gesture input based on at least one of a type, shape, size, moving information (e.g., moving distance, moving speed, or moving direction) of the gesture input, a distance from the electronic device 200, the number of repetitions, and a location of the electronic device 200. For example, the processor 210 may control the display device 240 to display a visual object corresponding to a gesture input sensed through the sensor module 230 on at least a portion of a service screen for a chat service. For example, a visual object may refer to an object that is visually displayed on the display device 240. For example, a visual object may be referred to as an icon, an emoticon, an emoji, a sticker, or an actcion. For example, the processor 210 may set a background screen corresponding to a gesture input sensed through the sensor module 230 as a background screen of at least one application program. For example, at least one application program may include an application program related to at least one of a phone service, a chat service, and a lock service.

According to an embodiment, the processor 210 may control the wireless communication circuit 220 to transmit information related to a visual effect corresponding to a gesture input sensed through the sensor module 230 to another electronic device (e.g., the electronic device 102 or 104 in FIG. 1) in providing a chat service. For example, information related to the visual effect may include at least one of information related to a gesture input, information related to a visual object, and request information for setting (or changing) a background screen.

According to various embodiments, the processor 210 may control the display device 240 to display a visual effect received from another electronic device (e.g., the electronic device 102 or 104 in FIG. 1) through the wireless communication circuit 220 in providing a chat service. According to an embodiment, in providing a chat service, the processor 210 may check whether the same visual effect is displayed when receiving information related to a visual effect from another electronic device (e.g., the electronic device 102 or 104 of FIG. 1). The processor 210 may control the display device 240 to update a corresponding visual effect when the same visual effect is displayed on at least a portion of the display device 240. For example, the processor 210 may control the display device 240 to update at least one of a type, shape, size, color, brightness, or movement (e.g., speed or direction) of a visual effect based on the number of occurrences of the same visual effect. For example, the same visual effect may include at least one of a visual effect previously received from another electronic device and a visual effect corresponding to a gesture input sensed in the electronic device 200. For example, the number of occurrences of the same visual effect may include at least one of the number of times a visual effect is generated in the electronic device 200 and/or the number of times a visual effect is received from another electronic device.

According to various embodiments, the wireless communication circuit 220 may support communication using a wireless channel between the electronic device 200 and another electronic device (e.g., the electronic device 102 or 104 in FIG. 1). For example, a wireless channel between the electronic device 200 and another electronic device (e.g., the electronic device 102 or 104 in FIG. 1) may be established based on a short-range communication method or a cellular communication method.

According to various embodiments, the sensor module 230 may sense an external environmental state of the electronic device 200 and provide sensed information to the processor 210. According to an embodiment, the sensor module 230 may include a spatial sensor for sensing a movement of an object (e.g., a gesture) in at least a partial area (e.g., external space) adjacent to the electronic device 200. For example, a spatial sensor may include at least one of an image sensor (e.g., a camera module), an optical sensor (e.g., an infrared sensor), and a depth sensor.

According to various embodiments, the display device 240 may display information processed by the electronic device 200. According to an embodiment, the display device 240 may display a visual effect corresponding to a gesture input sensed by the sensor module 230 on at least a portion of a screen for a chat service. According to an embodiment, the display device 240 may display a visual effect received from another electronic device (e.g., the electronic device 102 or 104 in FIG. 1) through the wireless communication circuit 220 on at least a portion of a screen for a chat service.

According to various embodiments, the memory 250 may store various data used by at least one component (e.g., the processor 210 or the sensor module 230) of the electronic device 200. For example, data may include information on a visual effect corresponding to a gesture input.

According to various embodiments, the electronic device 200 may transmit recognition information of a gesture input to an external device (e.g., the server 108). The external device (e.g., the server 108) may learn recognition information of the gesture input provided from the electronic device 200 to improve the recognition of the gesture input of the electronic device 200.

According to various embodiments, the electronic device (e.g., the electronic device 101 in FIG. 1 or the electronic device 200 in FIG. 2) may include a sensor module (e.g., the sensor module 176 in FIG. 1 or the sensor module 230 in FIG. 2), a wireless communication circuit (e.g., the wireless communication module 192 in FIG. 1 or the wireless communication circuit 220 in FIG. 2), a display device (e.g., the display device 160 in FIG. 1 or the display device 240 in FIG. 2), and at least one processor (e.g., the processor 120 in FIG. 1 or the processor 210 in FIG. 2) operatively connected to the sensor module, the wireless communication circuit, and the display device. The at least one processor senses a gesture input through the sensor module, controls the display device to display a first visual effect corresponding to the gesture input, and controls the display device to update the first visual effect displayed on the display device to a second visual effect when receiving information related to the first visual effect from another electronic device through the wireless communication circuit.

According to various embodiments, the at least one processor may control the display device to display a first visual effect based on at least one of a type of a gesture input sensed by the sensor module, a shape of the gesture input, a moving distance of the gesture input, a moving speed of the gesture input, a moving direction of the gesture input, a distance between a location at which the gesture input is sensed and the electronic device, the number of repetitions of the gesture input, and the location of the electronic device.

According to various embodiments, the at least one processor may select the first visual effect based on at least one of the location of the electronic device, a type of the gesture input, and a shape of the gesture input, and may configure the size, location and moving information of the first visual effect based on at the least of one of a moving distance of the gesture input, a moving speed of the gesture input, a moving direction of the gesture input, a distance between a location at which the gesture input is sensed and the electronic device, and the number of repetitions of the gesture input.

According to various embodiments, the at least one processor may control the display device to display the first visual effect including at least one of displaying a visual object corresponding to the gesture input and setting a background screen corresponding to the gesture input.

According to various embodiments, the at least one processor may select the second visual effect based on the number of times the first visual effect is generated and/or the number of times information related to the first visual effect is received.

According to various embodiments, when receiving information related to the first visual effect from the other electronic device through the wireless communication circuit, the at least one processor may control the display device to display the second visual effect in which at least one of a type, shape, size, color, brightness, and movement of the first visual effect displayed on the display device is updated.

According to various embodiments, the at least one processor may control the sensor module to be activated when a plurality of other electronic devices is connected to a messenger service to which the electronic device is connected.

According to various embodiments, when sensing the gesture input through the sensor module, the at least one processor may transmit information related to the first visual effect to another electronic device through the wireless communication circuit.

According to various embodiments, an electronic device (e.g., the electronic device 101 in FIG. 1 or the electronic device 200 in FIG. 2) may include a wireless communication circuit (e.g., the wireless communication module 192 in FIG. 1 or the wireless communication circuit 220 in FIG. 2), a display device (e.g., the display device 160 of FIG. 1 or the display device 240 of FIG. 2), and at least one processor (e.g., the processor 120 in FIG. 1 or the processor 210 in FIG. 2) operatively connected to the wireless communication circuit and the display device. The at least one processor may control the display device to display a first visual effect when receiving information related to the first visual effect from another electronic device through the wireless communication circuit, and may control the display device to update the first visual effect displayed on the display device to a second visual effect when receiving the information related to the first visual effect from another electronic device through the wireless communication circuit.

According to various embodiments, the first visual effect may include at least one of displaying a visual object corresponding to the gesture input or configurating a background screen corresponding to the gesture input.

According to various embodiments, the at least one processor may select the second visual effect based on the number of times information related to the first visual effect is received.

According to various embodiments, when receiving information related to the first visual effect from the other electronic device through the wireless communication circuit, the at least one process may control the display device to display the second visual effect in which at least one of a type, shape, size, color, brightness and movement of the first visual effect displayed on the display device is updated.

Figure 3:
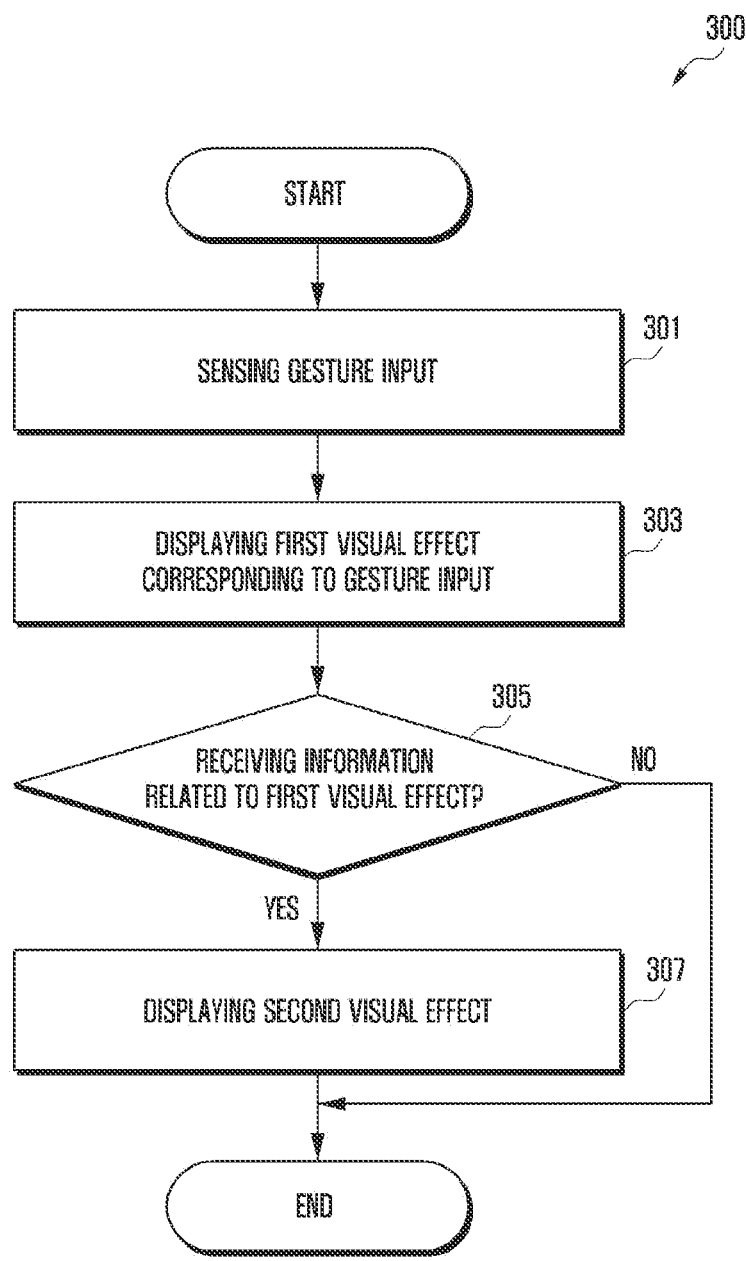
FIG. 3 illustrates a flowchart for providing a visual effect corresponding to a gesture input in an electronic device according to various embodiments of the present disclosure.
Figure 4A:
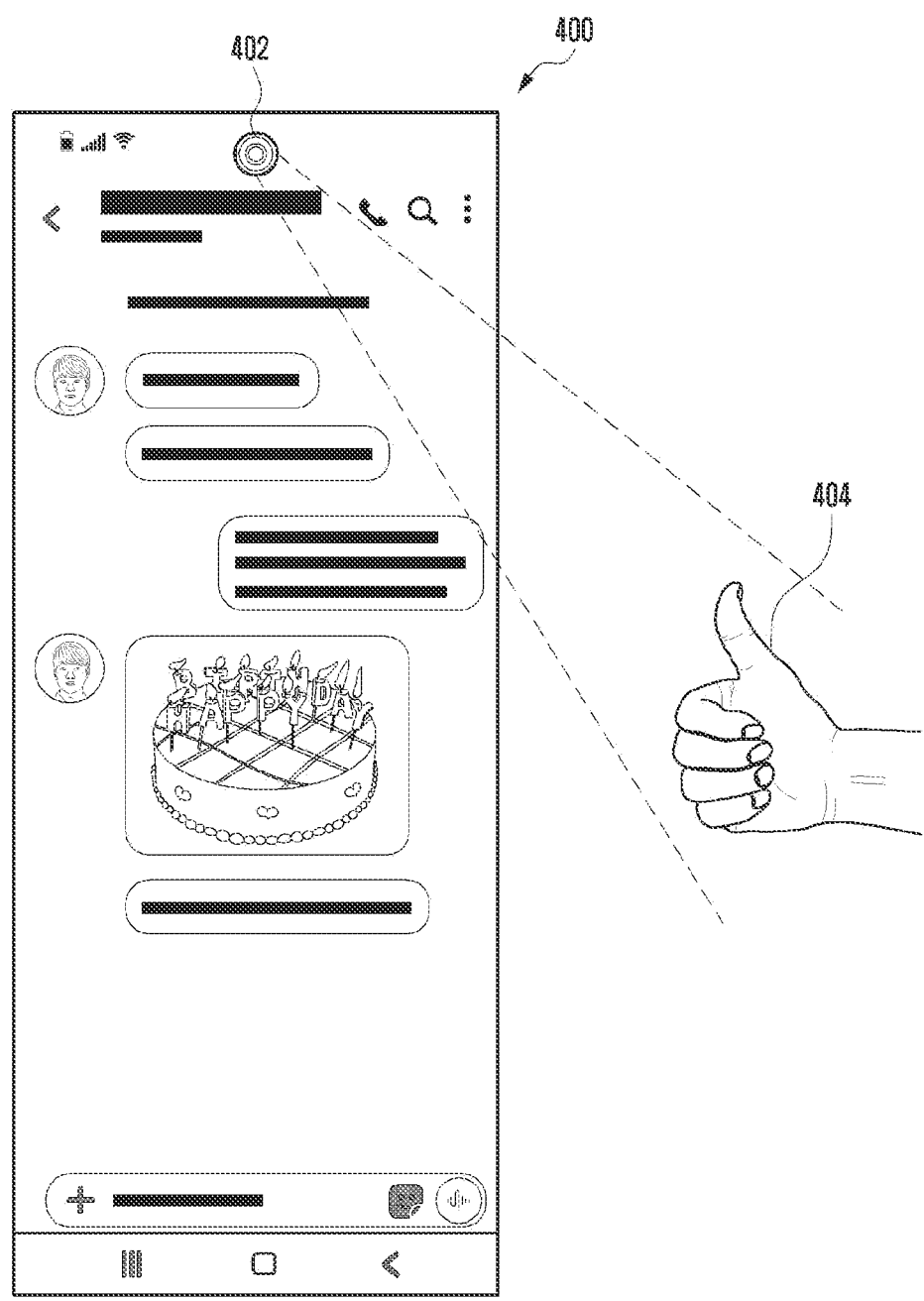
FIG. 4A illustrates an example of a gesture input for displaying a visual object according to various embodiments of the present disclosure.
Figure 4B:
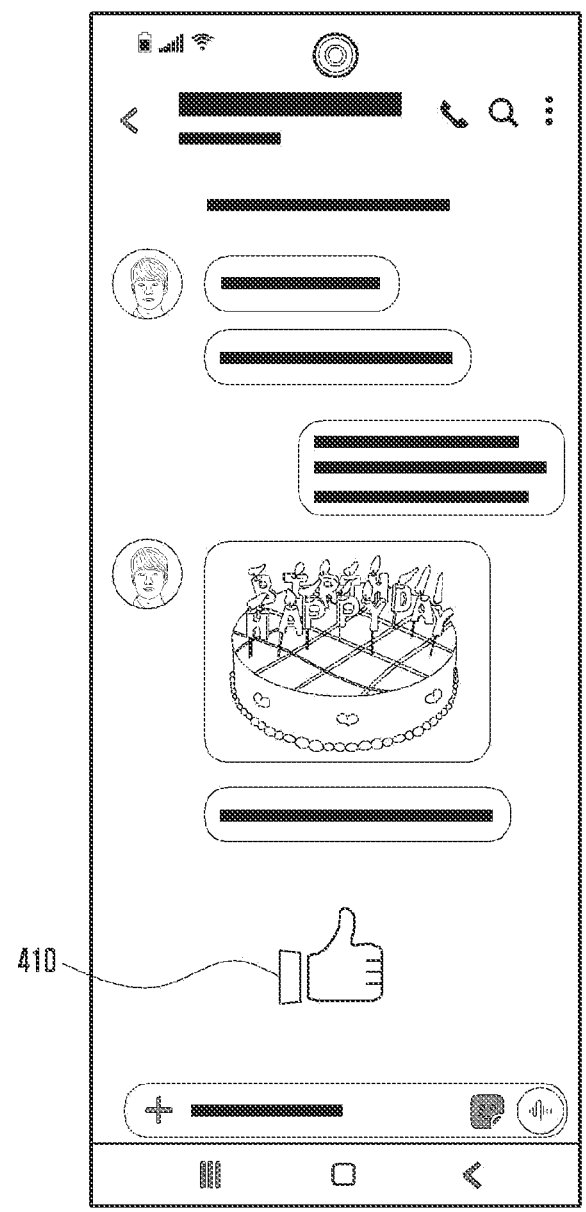
FIG. 4B illustrates an example of a screen constitution for displaying a visual object corresponding to a gesture input in an electronic device according to various embodiments of the present disclosure.
Figure 4C:
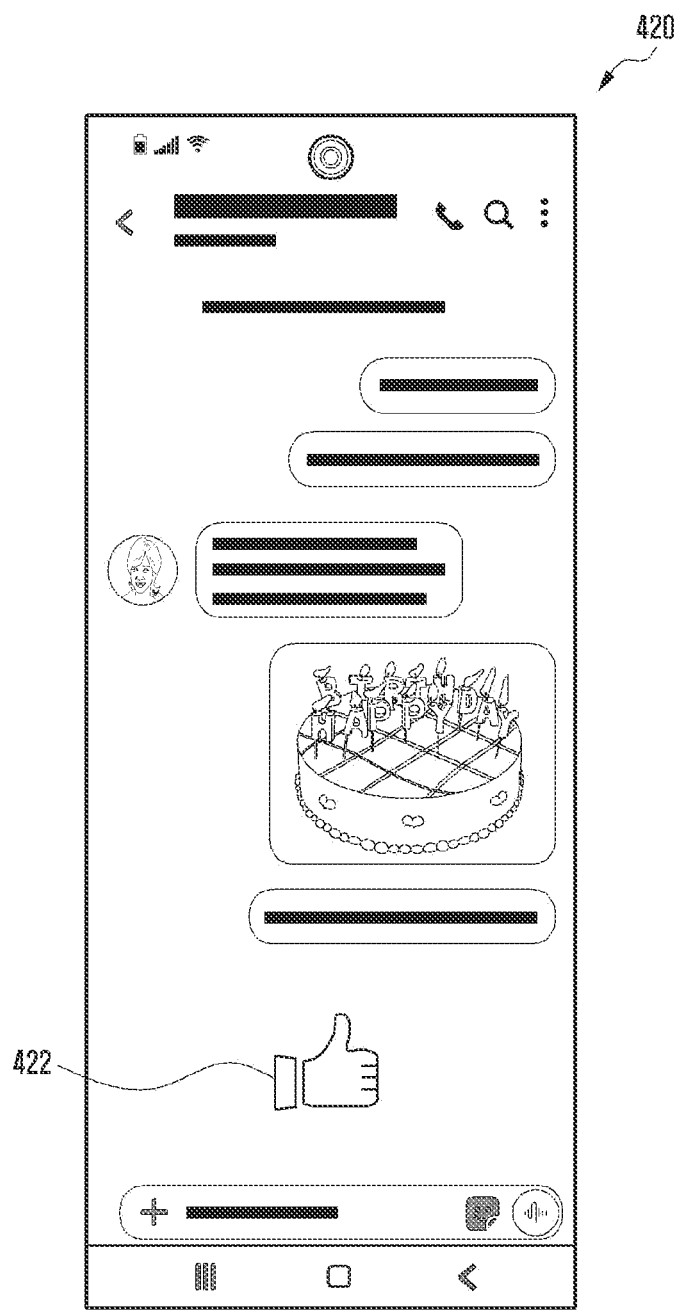
FIG. 4C illustrates a screen constitution for displaying a visual object received from another electronic device in an electronic device according to various embodiments of the present disclosure.
Figure 4D:
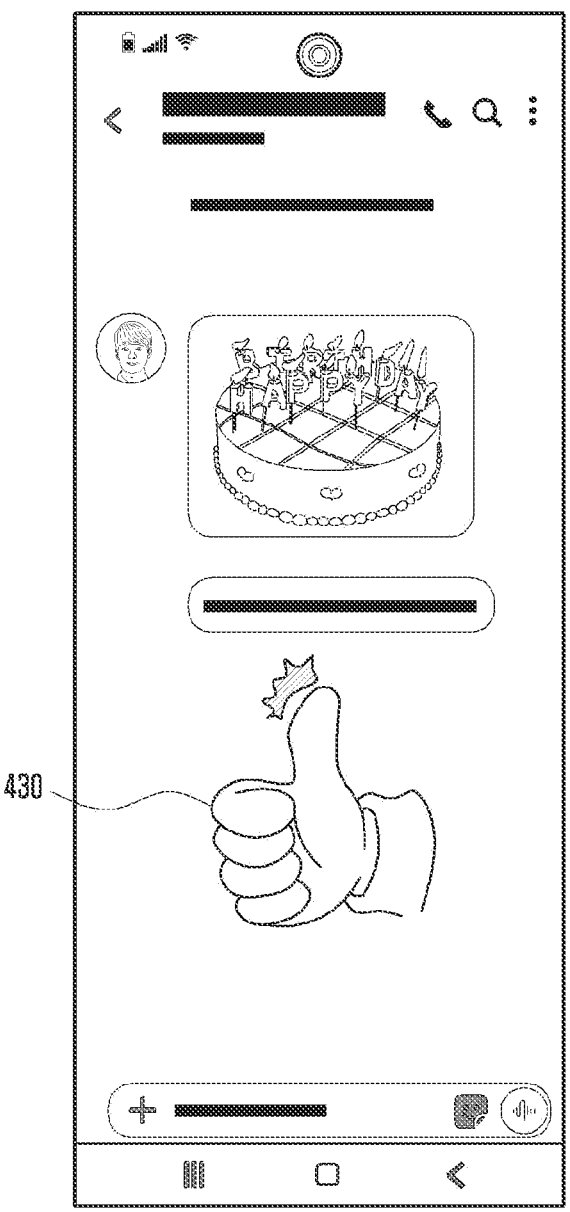
FIG. 4D illustrates a screen constitution for displaying an updated visual object corresponding to a gesture input in an electronic device according to various embodiments of the present disclosure.
Figure 5A:
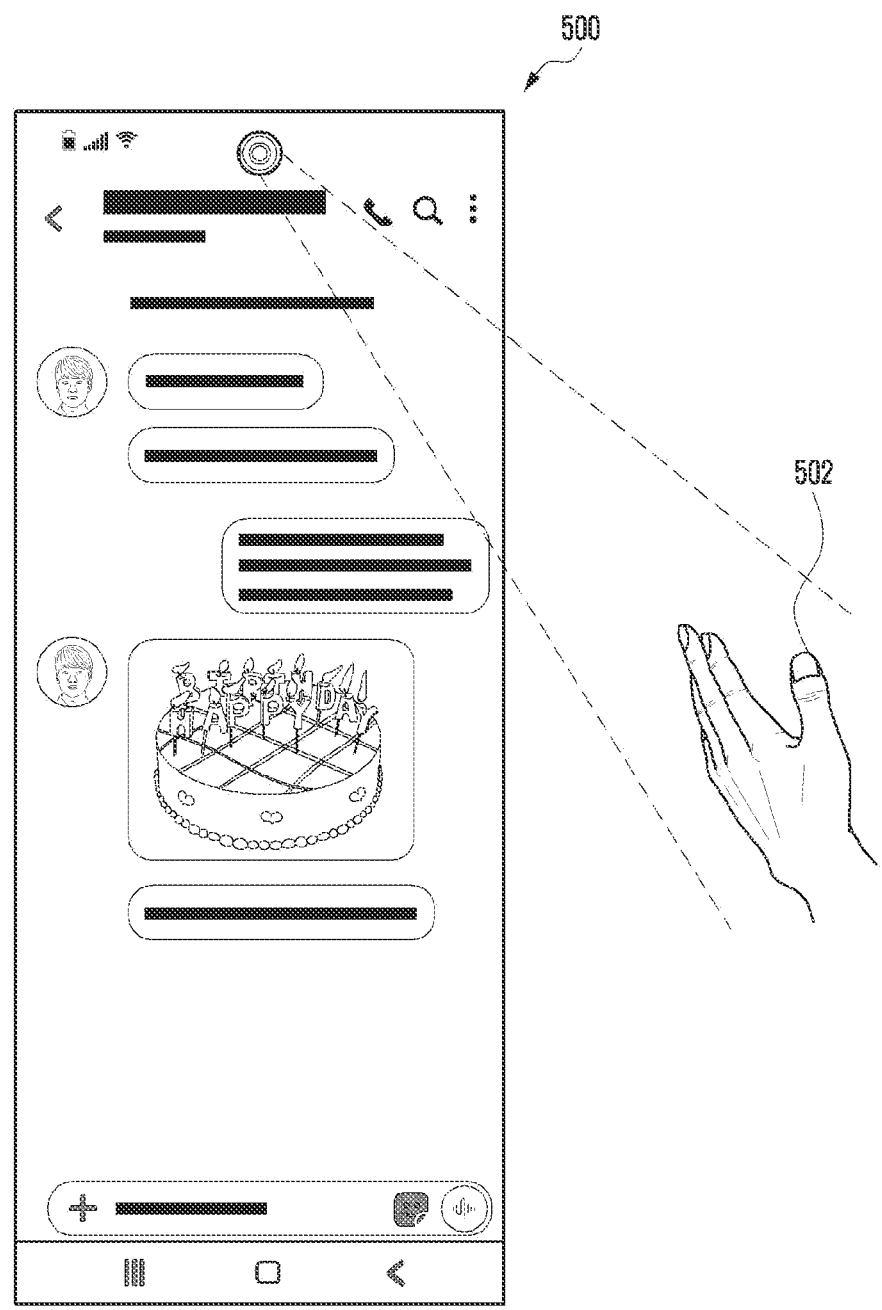
FIG. 5A illustrates an example of a gesture input for providing a background screen according to various embodiments of the present disclosure.
Figure 5B:
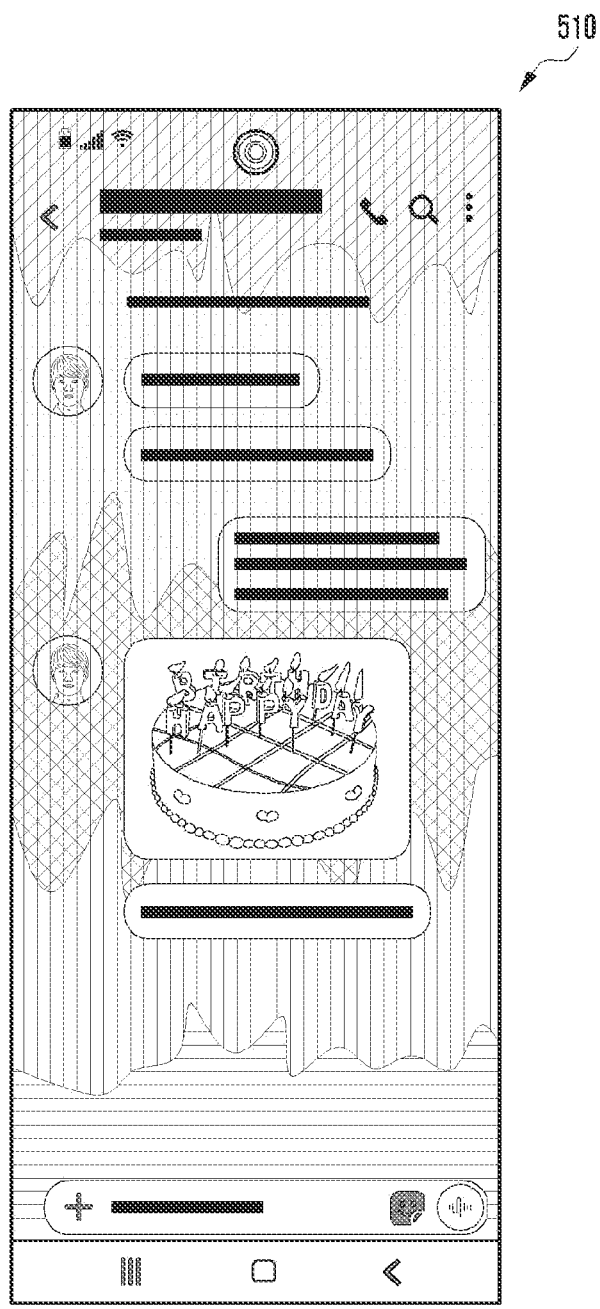
FIG. 5B illustrates a screen constitution for providing a background screen corresponding to a gesture input in an electronic device according to various embodiments of the present disclosure.
Figure 5C:
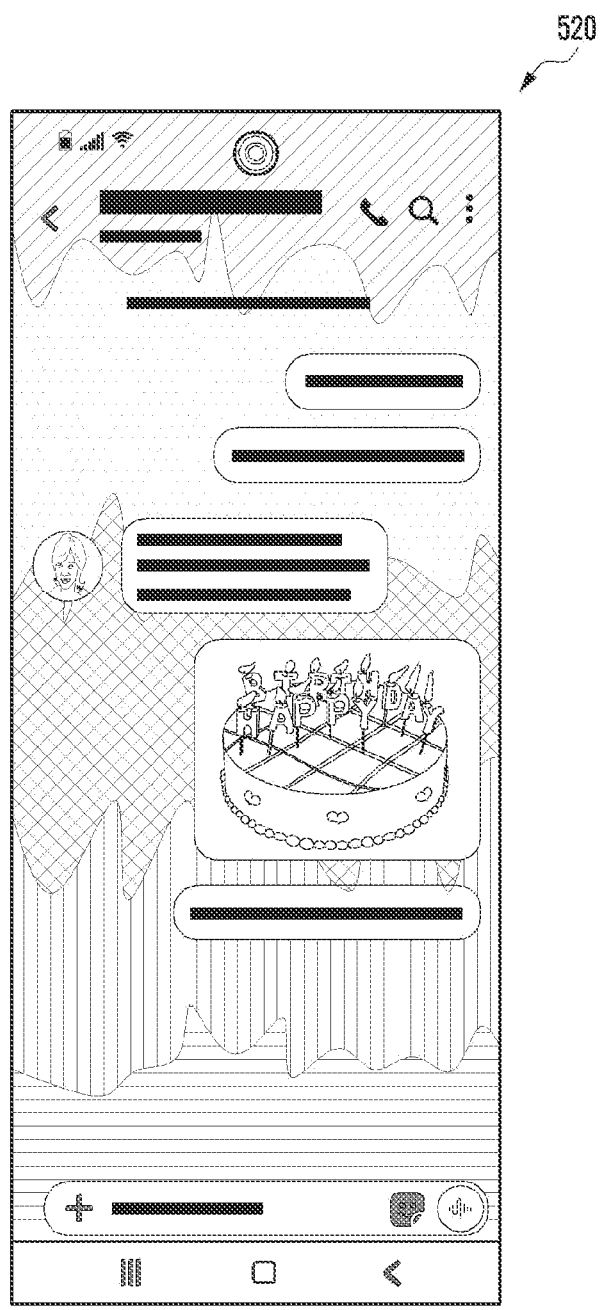
FIG. 5C illustrates a screen constitution for providing a background screen based on gesture information received from another electronic device in an electronic device according to various embodiments of the present disclosure.
Figure 5D:
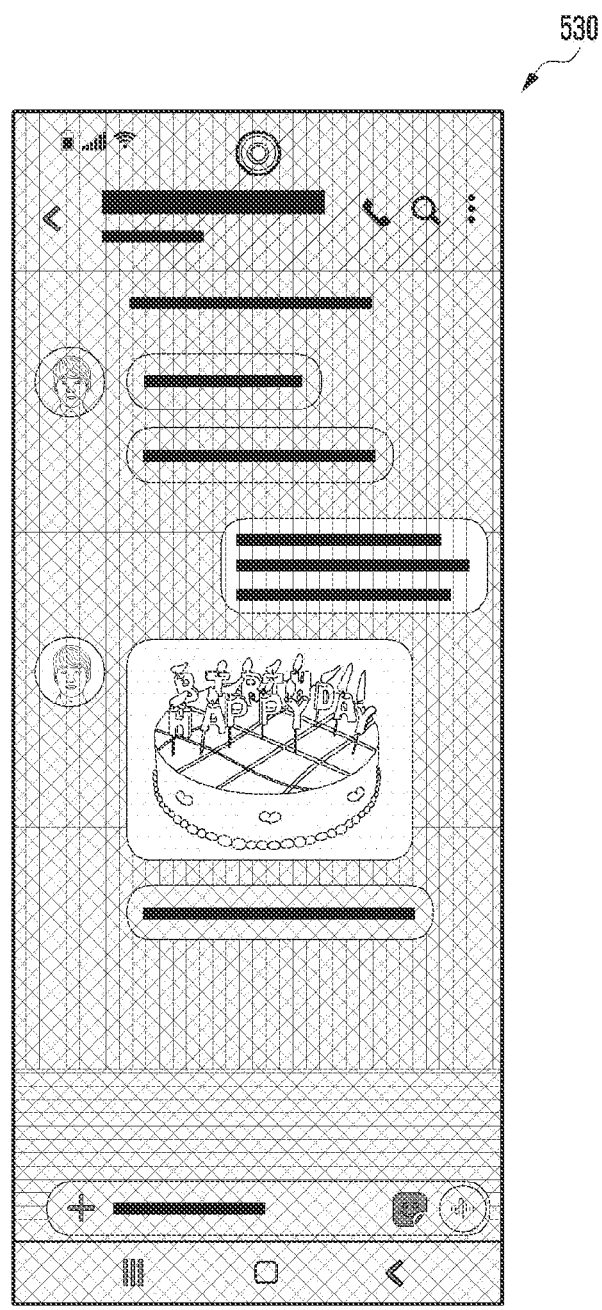
FIG. 5D illustrates a screen constitution for providing an updated background screen corresponding to a gesture input in an electronic device according to various embodiments of the present disclosure.
Figure 6A:
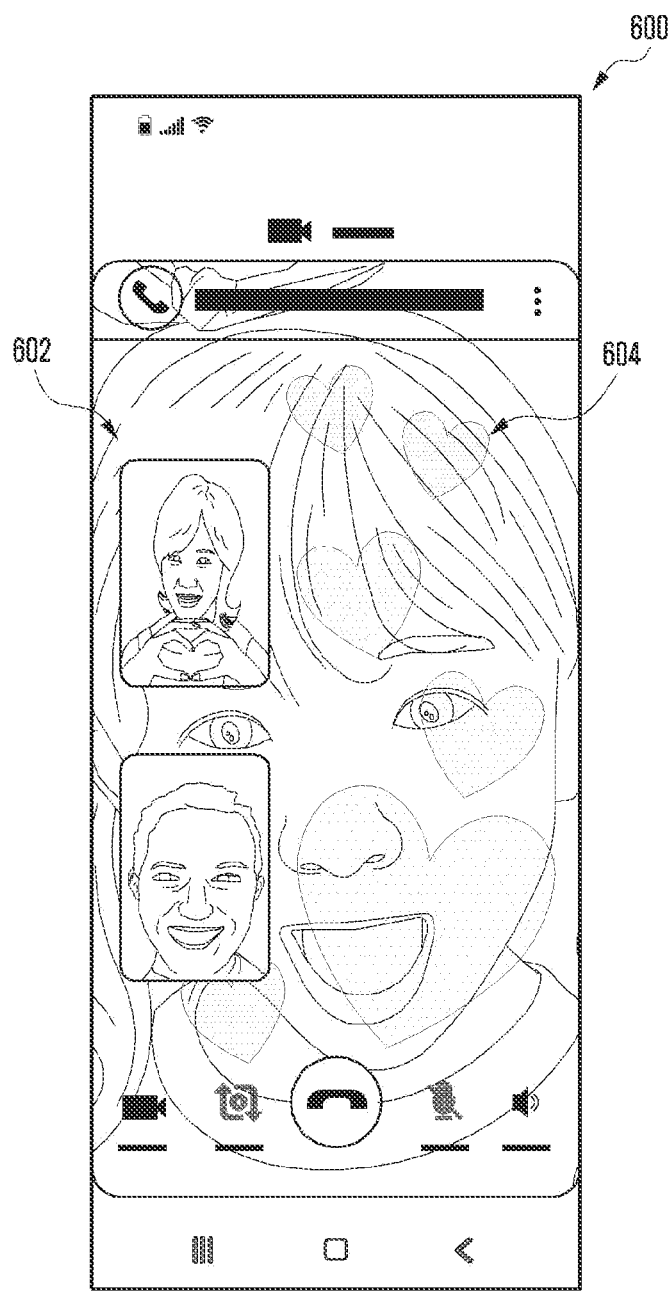
FIG. 6A illustrates a screen constitution of a video call service for providing a visual effect corresponding to a gesture input in an electronic device according to various embodiments of the present disclosure.
Figure 6B:
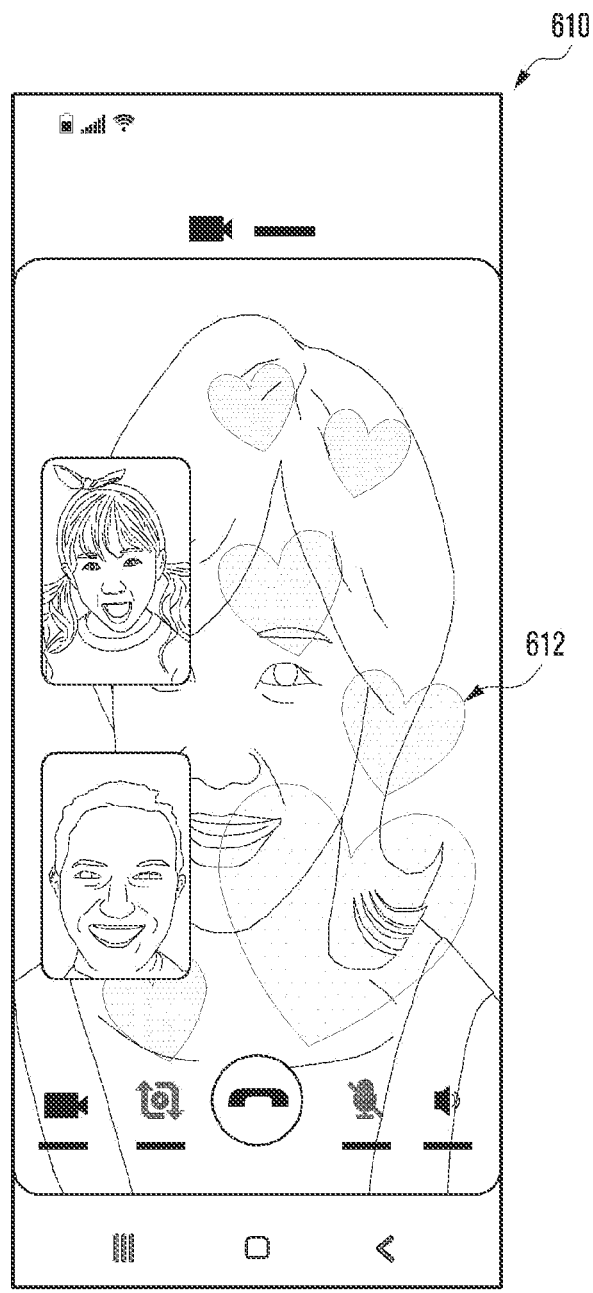
FIG. 6B illustrates a screen constitution of a video call service for providing a visual effect received from another electronic device in an electronic device according to various embodiments of the present disclosure.
Figure 6C:
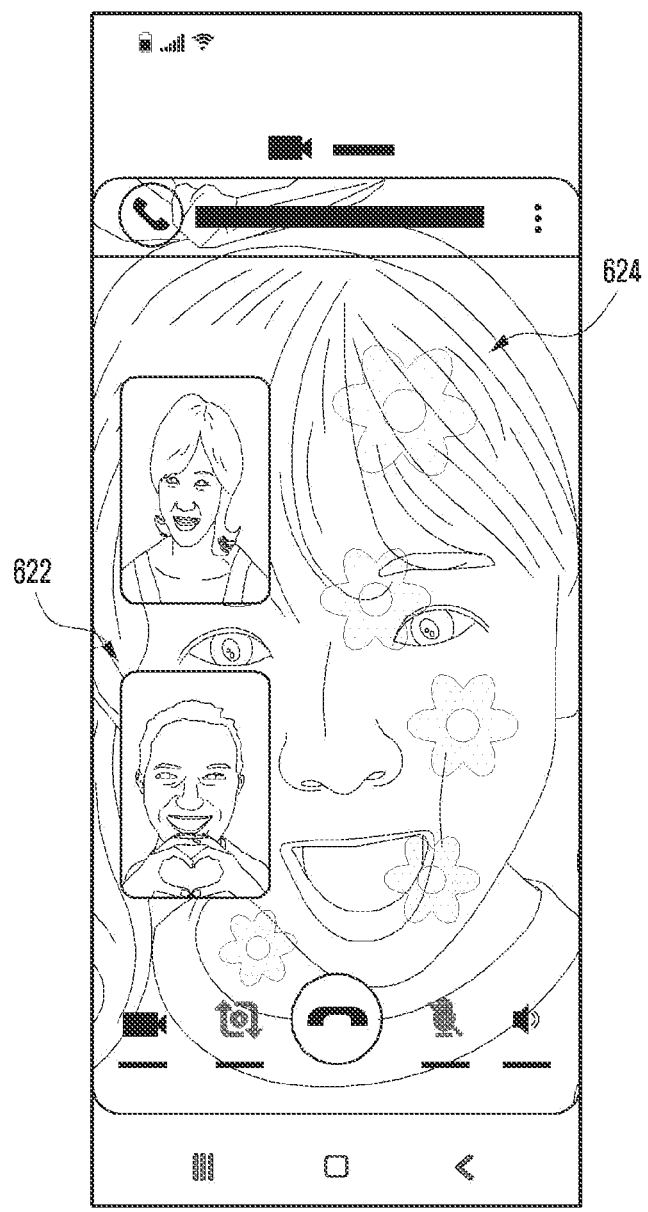
FIG. 6C illustrates a screen constitution of a video call service for providing an updated visual effect corresponding to a gesture input in an electronic device according to various embodiments of the present disclosure.

FIG. 3 illustrates a flowchart 300 for providing a visual effect corresponding to a gesture input in an electronic device according to various embodiments of the present disclosure. In the following embodiment, each operation may be sequentially performed, but is not necessarily performed sequentially. For example, the order of each operation may be changed, and at least two operations may be performed in parallel. For example, the electronic device in FIG. 3 may be the electronic device 101 in FIG. 1 or the electronic device 200 in FIG. 2. As an example, at least some constitutions in FIG. 3 will be described with reference to FIGS. 4A, 4B, 4C, 4D, 5A, 5B, 5C, 5D, 6A, 6B, and 6C. FIG. 4A illustrates an example of a gesture input for displaying a visual object according to various embodiments of the present disclosure. FIG. 4B illustrates an example of a screen constitution for displaying a visual object corresponding to a gesture input in an electronic device according to various embodiments of the present disclosure. FIG. 4C illustrates a screen constitution for displaying a visual object received from another electronic device in an electronic device according to various embodiments of the present disclosure. FIG. 4D illustrates a screen constitution for displaying an updated visual object corresponding to a gesture input in an electronic device according to various embodiments of the present disclosure. FIG. 5A illustrates an example of a gesture input for providing a background screen according to various embodiments of the present disclosure. FIG. 5B illustrates a screen constitution for providing a background screen corresponding to a gesture input in an electronic device according to various embodiments of the present disclosure. FIG. 5C illustrates a screen constitution for providing a background screen based on gesture information received from another electronic device in an electronic device according to various embodiments of the present disclosure. FIG. 5D illustrates a screen constitution for providing an updated background screen corresponding to a gesture input in an electronic device according to various embodiments of the present disclosure. FIG. 6A illustrates a screen constitution of a video call service for providing a visual effect corresponding to a gesture input in an electronic device according to various embodiments of the present disclosure. FIG. 6B illustrates a screen constitution of a video call service for providing a visual effect received from another electronic device in an electronic device according to various embodiments of the present disclosure. FIG. 6C illustrates a screen constitution of a video call service for providing an updated visual effect corresponding to a gesture input in an electronic device according to various embodiments.

With reference to FIG. 3, according to various embodiments, an electronic device (e.g., the processor 120 of FIG. 1 or the processor 210 of FIG. 2) may sense a gesture input in providing a chat service in operation 301. According to an embodiment, when the electronic device 200 provides a chat service with at least one other electronic device (e.g., the electronic device 102 or 104 of FIG. 1), the processor 210 may sense a gesture input in an actual space adjacent to the electronic device 200 through the sensor module 230. For example, the processor 210 may control the display device 240 to display a service screen 400 and/or 500 (e.g., a user interface) for a messenger service in providing a messenger service with at least one other electronic device (e.g., the electronic device 102 or 104 of FIG. 1) as illustrated in FIG. 4A and/or FIG. 5A. The processor 210 may sense a gesture input 404 and/or 502 through a camera module 402 (e.g., the sensor module 230) in providing a messenger service. For example, the processor 210 may control the display device 240 to display a service screen 600 for a video call in providing a video call service with at least one other electronic device (e.g., the electronic device 102 or 104 of FIG. 1), as illustrated in FIG. 6A. The processor 210 may sense a gesture input 602 through the sensor module 230 (e.g., a camera module) in providing a video call service.

According to various embodiments, in operation 303, an electronic device (e.g., the processor 120 or 210) may display a first visual effect corresponding to a gesture input on at least a portion of a service screen for a chat service. For example, a first visual effect may be identified based on at least one of a type, shape, size, moving information (e.g., moving distance, moving speed, or moving direction) of a gesture input, a distance from the electronic device 200, the number of repetitions, and a location of the electronic device 200. For example, a distance from the electronic device 200 may include a distance between a location at which a gesture is input and the electronic device 200.

According to an embodiment, in providing a messenger service, the processor 210 may control the display device 240 to display a first icon 410 corresponding to the first gesture input 404 on at least a portion of the service screen 400 for a messenger service, as illustrated in FIG. 4B, when sensing the first gesture input 404. In addition, the processor 210 may control the wireless communication circuit 220 to transmit information related to the first icon 410 to another electronic device (e.g., the electronic device 102 or 104 in FIG. 1) participating in the messenger service. For example, another electronic device participating in a messenger service may display a first icon 422 provided from the electronic device 200 on at least a portion of a service screen 420 for a messenger service, as illustrated in FIG. 4C.

According to an embodiment, in providing a messenger service, the processor 210 may control the display device 240 to display a background of the service screen 500 for a messenger service as a first background screen 510 corresponding to the second gesture input 502, as illustrated in FIG. 5B, when sensing the second gesture input 502. In addition, the processor 210 may control the wireless communication circuit 220 to transmit information related to the first background screen 510 to another electronic device (e.g., the electronic device 102 or 104 in FIG. 1) participating in a messenger service. For example, another electronic device participating in a messenger service may display a background of a service screen for a messenger service as the first background screen 520 provided from the electronic device 200, as illustrated in FIG. 5C.

According to an embodiment, in providing a video call service, the processor 210 may control the display device 240 to display a first animation effect 604 corresponding to the third gesture input 602 on at least a portion of the service screen 600 for a video call service, as illustrated in FIG. 6A, when sensing the third gesture input 602. In addition, the processor 210 may control the wireless communication circuit 220 to transmit information related to the first animation effect 604 to another electronic device (e.g., the electronic device 102 or 104 in FIG. 1) participating in a video call service. For example, another electronic device participating in a messenger service may display a first animation effect 612 on at least a portion of a service screen 610 for a video call service, as illustrated in FIG. 6B.

According to various embodiments, in operation 305, an electronic device (e.g., the processor 120 or 210) may check whether information related to a first visual effect is received from another electronic device (e.g., the electronic device 102 or 104 in FIG. 1) participating in a chat service. According to an embodiment, the processor 210 may identify whether information related to a first visual effect is received from at least one other electronic device (e.g., the electronic device 102 or 104 in FIG. 1) participating in a chat service through the wireless communication circuit 220 while providing a chat service.

According to various embodiments, an electronic device (e.g., the processor 120 or 210) may update a first visual effect displayed on a display device (e.g., the display device 240) to a second visual effect in operation 307 when receiving information related to a first visual effect from another electronic device (e.g., the electronic device 102 or 104 in FIG. 1) participating in a chat service (e.g., operation 305). For example, a second visual effect may include a visual effect updated based on the number of occurrences of a first visual effect. For example, a second visual effect may include a visual effect in which at least one of a type, shape, size, color, brightness, and movement (e.g., speed or direction) of a first visual effect is updated. As an example, the number of occurrences of a first visual effect may include at least one of the number of times a first visual effect is generated in the electronic device 200 and/or the number of times information related to a first visual effect is received from another electronic device.

According to an embodiment, as illustrated in FIG. 4B, the processor 210 may identify whether information related to the first icon 410 is received from another electronic device (e.g., the electronic device 102 or 104 of FIG. 1) in a state in which the first icon 410 corresponding to the first gesture input 404 is displayed on at least a portion of the service screen 400 for a messenger service. The processor 210 may control the display device 240 to update the first icon 410 corresponding to the first gesture input 404 displayed on the display device 240 to a second icon 430, as illustrated in FIG. 4D, when receiving information related to the first icon 410 through the wireless communication circuit 220.

According to an embodiment, the processor 210 may check whether information related to the first background screen 510 is received from another electronic device (e.g., the electronic device 102 or 104 in FIG. 1) in a state in which a background of the service screen 500 for a messenger service is displayed as the first background screen 510 corresponding to the second gesture input 502, as illustrated in FIG. 5B. The processor 210 may control the display device to update the first background screen 510 corresponding to the second gesture input 502 displayed on the display device 240 to a second background screen 530, as illustrated in FIG. 5D, when receiving information related to the first background screen 510 through the wireless communication circuit 220. For example, the second background screen 530 may include a background screen in which at least a partial constitution of the first background screen 510 is updated.

According to an embodiment, the processor 210 may check whether information related to the first animation effect 604 is received from another electronic device (e.g., the electronic device 102 or 104 in FIG. 1) 622 in a state in which the first animation effect 604 corresponding to the third gesture input 602 is displayed on at least a portion of the service screen 500 for a video call service, as illustrated in FIG. 6A. The processor 210 may control the display device 240 to update the first animation effect 604 corresponding to the third gesture input 602 displayed on the display device 240 to a second animation effect 624, as illustrated in FIG. 6C, when receiving information related to the first animation effect 604 through the wireless communication circuit 220.

According to various embodiments, an electronic device (e.g., the processor 120 of FIG. 1 or the processor 210 of FIG. 2) may update a visual effect corresponding to a gesture input based on an additional input. According to an embodiment, the processor 210 may identify whether an additional input is received in a state in which the first icon 410 is displayed, as illustrated in FIG. 4B. The processor 210 may control the display device 240 to change a location or size of the first icon 410 based on an additional input. According to an embodiment, the processor 210 may check whether an additional input is received in a state in which a background of a messenger service is displayed as the first background screen 510 corresponding to the second gesture input 502 as illustrated in FIG. 5B. The processor 210 may control the display device 240 to change at least a portion of the first background screen 510 based on an additional input.

Figure 7:
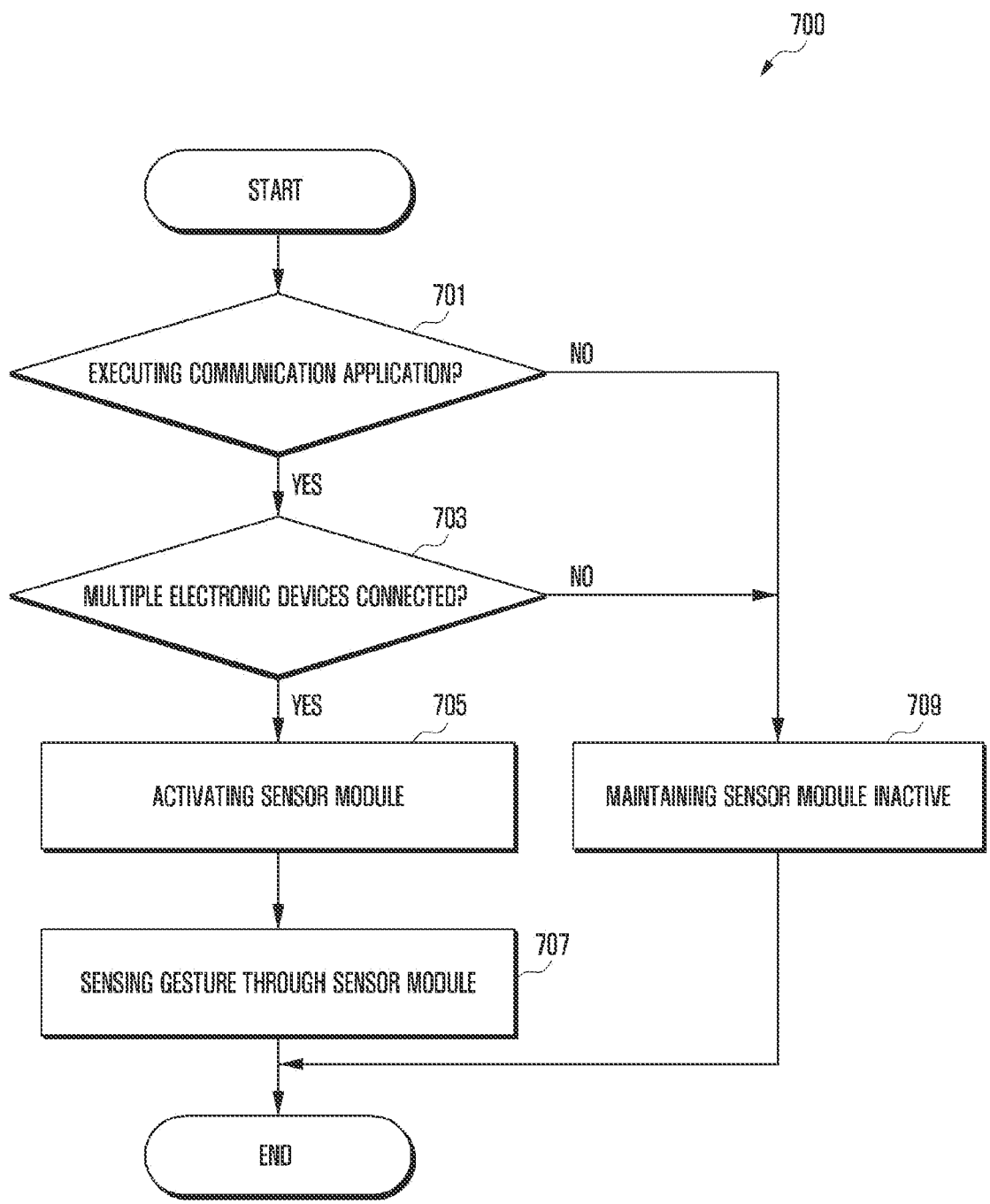
FIG. 7 illustrates a flowchart for sensing a gesture input in an electronic device according to various embodiments of the present disclosure.

FIG. 7 is a flowchart 700 for sensing a gesture input in an electronic device according to various embodiments. According to an embodiment, the operations in FIG. 7 may be detailed operations of operation 301 in FIG. 3. In the following embodiment, each operation may be sequentially performed, but is not necessarily performed sequentially. For example, the order of each operation may be changed, and at least two operations may be performed in parallel. For example, an electronic device in FIG. 7 may be the electronic device 101 in FIG. 1 or the electronic device 200 in FIG. 2.

With reference to FIG. 7, according to various embodiments, an electronic device (e.g., the processor 120 in FIG. 1 or the processor 210 in FIG. 2) may determine whether a communication application program for a chat service is executed in operation 701. According to an embodiment, the processor 210 may identify whether a user input corresponding to a visual object related to a communication application program displayed on at least a portion of the display device 240 is received.

According to various embodiments, an electronic device (e.g., the processor 120 or 210) may identify whether there are multiple other electronic devices connected to a chat service in operation 703 when executing a communication application program for a chat service (e.g., 'Yes' in operation 701). According to an embodiment, the processor 210 may identify whether multiple other electronic devices (e.g., the electronic device 102 or 104 in FIG. 1) is participated in a messenger service by a communication application program.

According to various embodiments, when multiple other electronic devices are connected to a chat service (e.g., 'Yes' in operation 703), an electronic device (e.g., the processor 120 or 210) may activate a sensor module (e.g., the sensor module 230) to sense a gesture input in operation 705. According to an embodiment, when multiple other electronic devices participate in a messenger service to which the electronic device 200 connects by executing a communication application program, the processor 210 may control the sensor module 230 so that the sensor module 230 is activated to sense a gesture input. For example, the sensor module 230 may sense a movement (e.g., a gesture) of an external object (e.g., a hand) in at least a partial area (e.g., actual space) within a reference distance from the electronic device 200.

According to various embodiments, an electronic device (e.g., the processor 120 or 210) may sense a gesture input through a sensor module (e.g., the sensor module 230) in operation 707. According to an embodiment, the processor 210 may identify whether a gesture input to which a visual effect is mapped is sensed through the sensor module 230.

According to various embodiments, when a communication application program for a chat service is not executed (e.g., 'No' in operation 701), or one other electronic device is connected to a chat service (e.g., 'No' in operation 703), an electronic device (e.g., the processor 120 or 210) may deactivate a sensor module (e.g., the sensor module 230) in operation 709. According to an embodiment, the processor 210 may control the sensor module 230 to maintain an inactive state of the sensor module 230.

According to various embodiments, when at least one other electronic device participates in a chat service to which the electronic device 200 connects, an electronic device (e.g., the processor 120 in FIG. 1 or the processor 210 in FIG. 2) may activate the sensor module 230 to sense a gesture input.

Figure 9A:
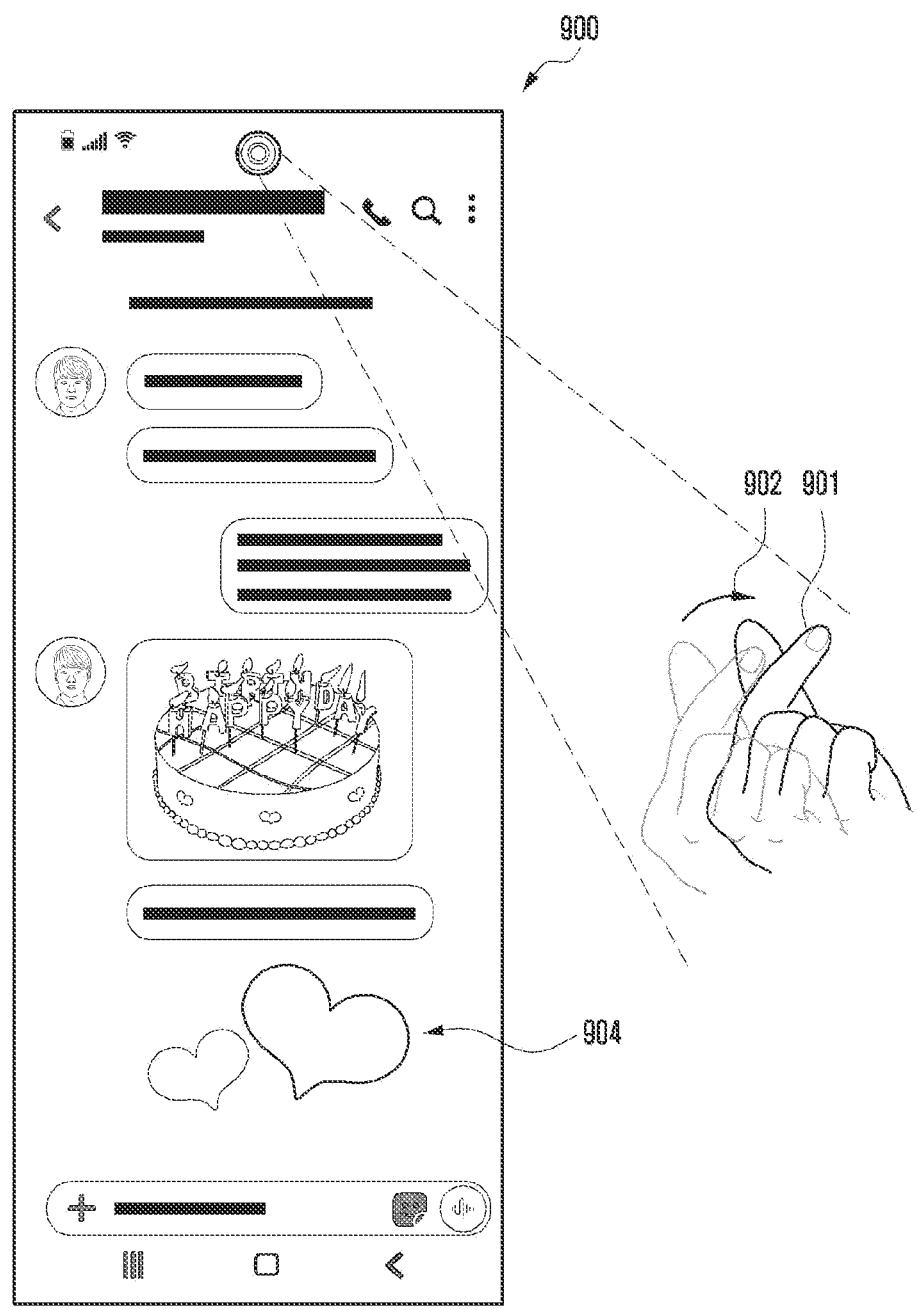
FIG. 9A illustrate another example of a gesture input for displaying a visual object in an electronic device according to various embodiments of the present disclosure.
Figure 9B:
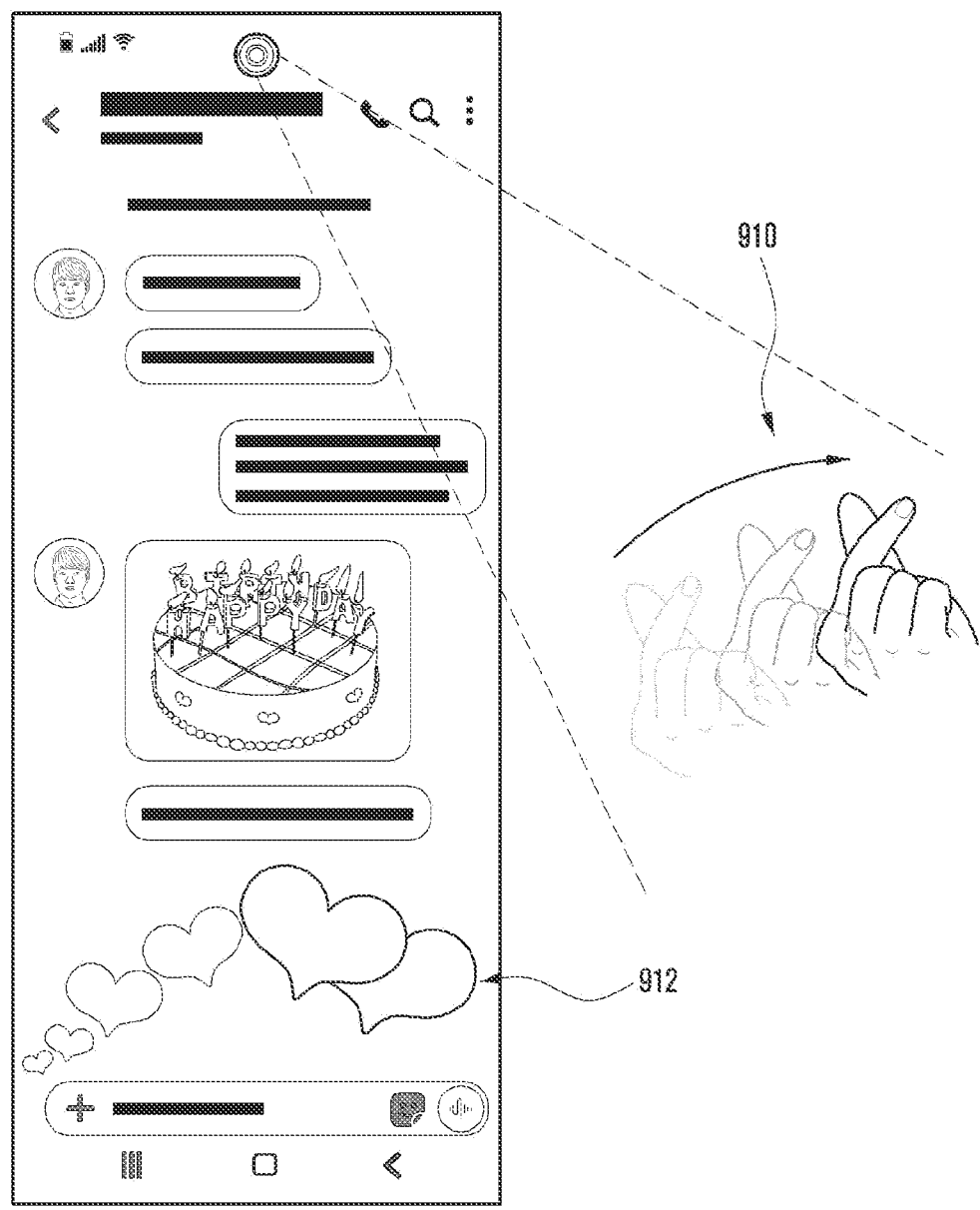
FIG. 9B illustrates an example of a screen constitution for displaying a visual object corresponding to a size of a gesture input in an electronic device according to various embodiments of the present disclosure.
Figure 9C:
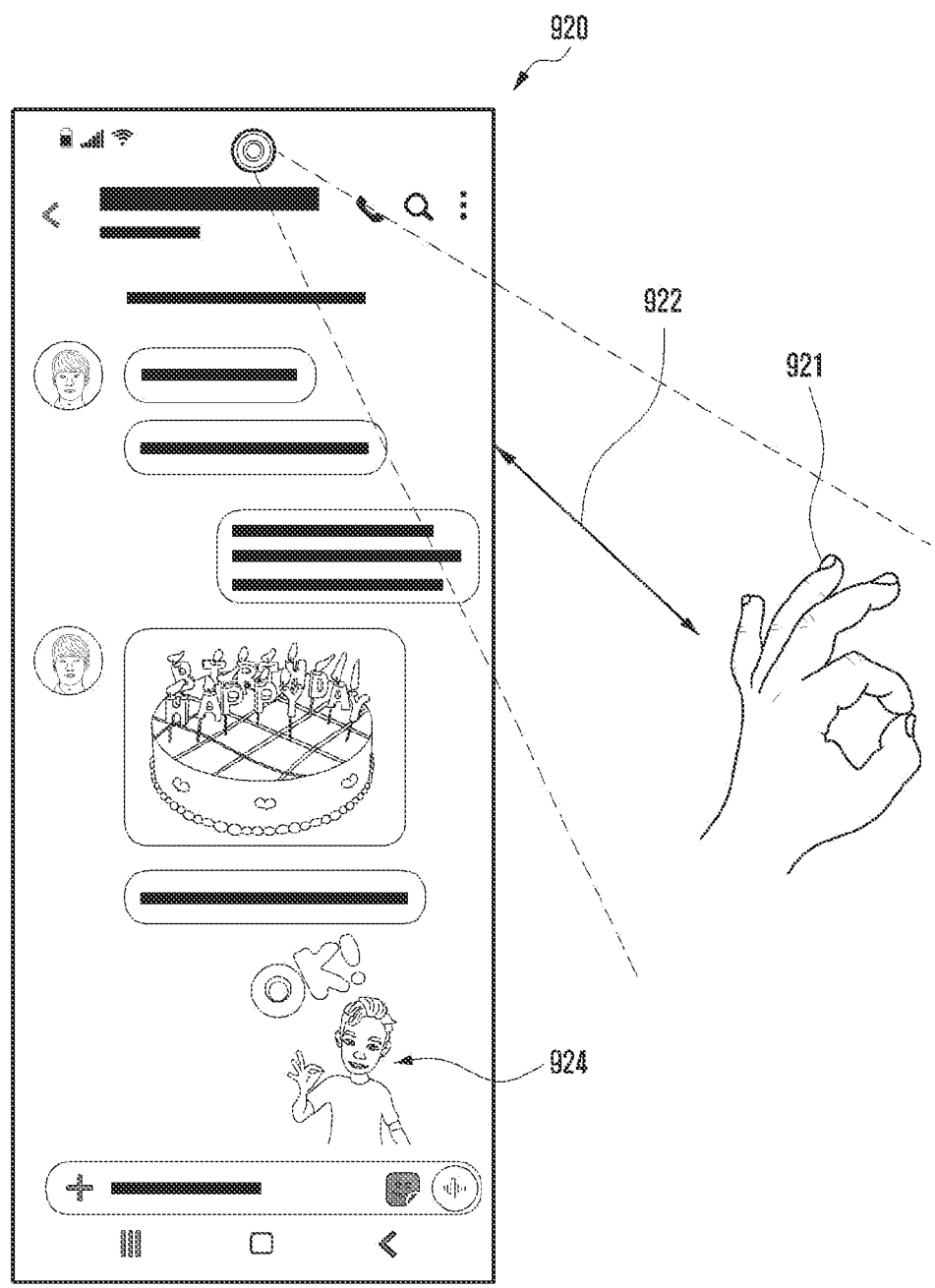
FIG. 9C illustrates another example of a gesture input for displaying a visual object in an electronic device according to various embodiments of the present disclosure.
Figure 9D:
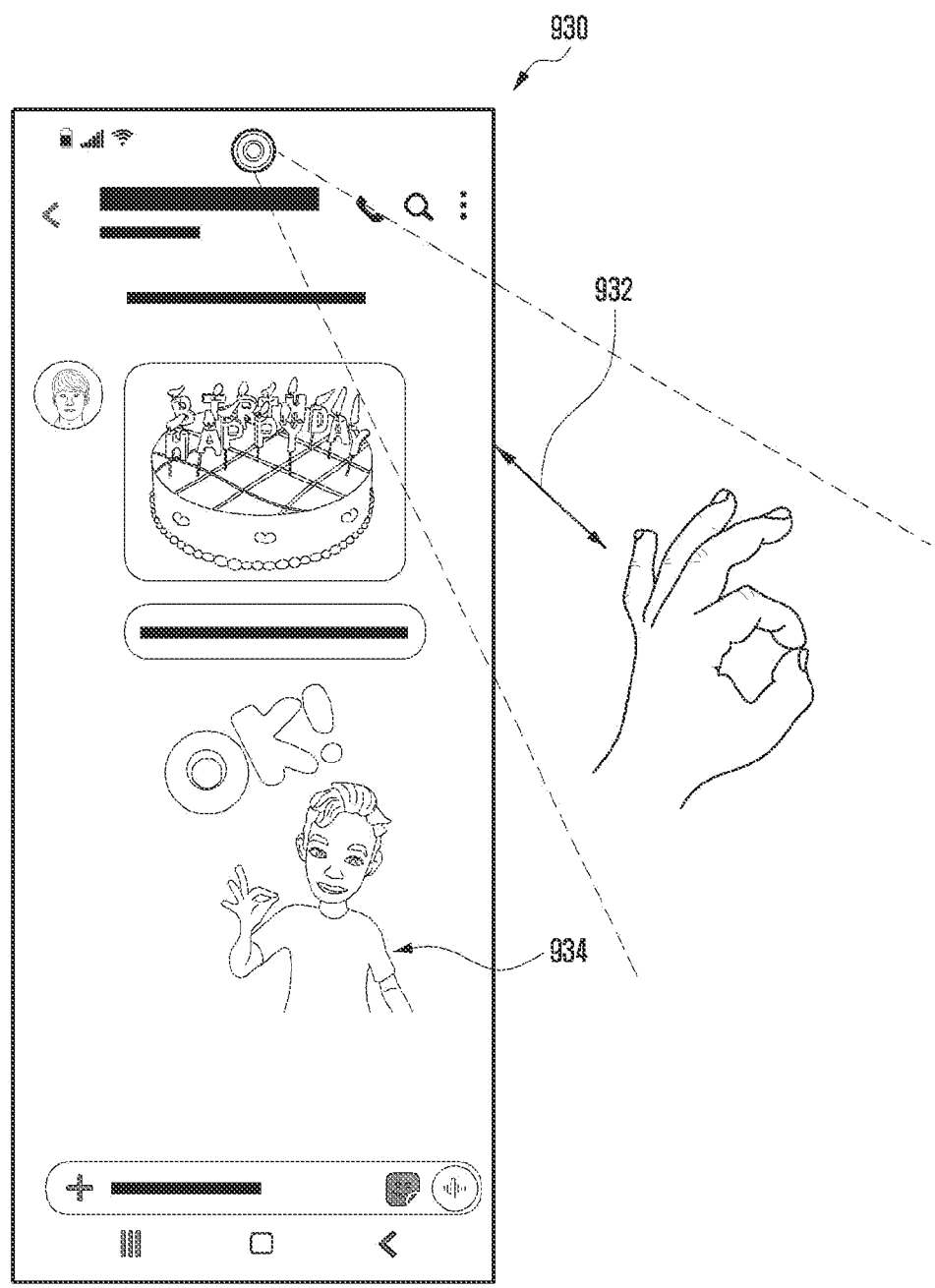
FIG. 9D illustrates another example of a screen constitution for displaying a visual object corresponding to a size of a gesture input in an electronic device according to various embodiments of the present disclosure.

FIG. 8 is a flowchart 800 for setting a size of a visual object based on a gesture input in an electronic device according to various embodiments of the present disclosure. According to an embodiment, the operations in FIG. 8 may be detailed operations of operation 303 in FIG. 3. In the following embodiment, each operation may be sequentially performed, but is not necessarily performed sequentially. For example, the order of each operation may be changed, and at least two operations may be performed in parallel. For example, an electronic device in FIG. 8 may be the electronic device 101 in FIG. 1 or the electronic device 200 in FIG. 2. As an example, at least some constitutions of FIG. 8 will be described with reference to FIGS. 9A, 9B, 9C, and 9D. FIG. 9A illustrate another example of a gesture input for displaying a visual object in an electronic device according to various embodiments of the present disclosure. FIG. 9B illustrates an example of a screen constitution for displaying a visual object corresponding to a size of a gesture input in an electronic device according to various embodiments of the present disclosure. FIG. 9C illustrates another example of a gesture input for displaying a visual object in an electronic device according to various embodiments of the present disclosure. FIG. 9D illustrates another example of a screen constitution for displaying a visual object corresponding to a size of a gesture input in an electronic device according to various embodiments of the present disclosure.

With reference to FIG. 8, according to various embodiments, in providing a chat service, an electronic device (e.g., the processor 120 in FIG. 1 or the processor 210 in FIG. 2) may identify a visual object corresponding to a gesture input in operation 801 when sensing a gesture input through a sensor module (e.g., the sensor module 230)) (e.g., operation 301 in FIG. 3). According to an embodiment, in providing a messenger service, the processor 210 may control the display device 240 to display a service screen 900 or 920 (e.g., a user interface) for a messenger service. In providing a messenger service, the processor 210 may check whether a gesture input is sensed through the sensor module 230 (e.g., a camera module). For example, the processor 210 may identify a visual object (e.g., heart icon) corresponding to a type and/or shape of a fourth gesture input 901, as illustrated in FIG. 9A and/or FIG. 9B, when sensing the fourth gesture input 901. For example, the processor 210 may identify a visual object (e.g., OK icon) corresponding to a type and/or shape of a fifth gesture input 921, as illustrated in FIG. 9C and/or FIG. 9D, when sensing the fifth gesture input 921. For example, a visual object may refer to an object that is visually displayed on the display device 240. For example, a visual object may be referred to as an icon, an emoticon, an emoji, a sticker, or an action.

According to various embodiments, in operation 803, an electronic device (e.g., the processor 120 or 210) may identify a size of a visual object based on a gesture input sensed through a sensor module (e.g., the sensor module 230) in providing a chat service. For example, a size of a visual object may be configured based on a size of a gesture input, moving information (e.g., a moving distance, a moving speed, or a moving direction), a distance from the electronic device 200, or the number of repetitions.

According to various embodiments, in operation 805, an electronic device (e.g., the processor 120 or 210) may display a visual object corresponding to a gesture input with a size set based on a gesture input. According to an embodiment, the processor 210 may control the display device 240 to display a visual object 904 corresponding to the fourth gesture input 901 with a size corresponding to a moving distance 902 of the fourth gesture input 901 as illustrated in FIG. 9A. According to an embodiment, as illustrated in FIG. 9B, the processor 210 may control the display device 240 to display a visual object 912 corresponding to the fourth gesture input 901 with a size corresponding to a moving distance 910 of the fourth gesture input 901. For example, a size of a visual object may be configured to be relatively large (or small) as a moving distance of the fourth gesture input 901 is relatively long.

According to an embodiment, as illustrated in FIG. 9C, the processor 210 may control the display device 240 to display a visual object 924 corresponding to a fifth gesture input 921 with a size corresponding to a distance 922 between the fifth gesture input 921 and the electronic device 200. According to an embodiment, as illustrated in FIG. 9D, the processor 210 may control the display device 240 to display a visual object 934 corresponding to the fifth gesture input 921 with a size corresponding to a distance 932 between the fifth gesture input 921 and the electronic device 200. For example, a size of a visual object may be configured to be relatively small (or large) as a distance between the fifth gesture input 921 and the electronic device 200 is relatively long.

Figure 10:
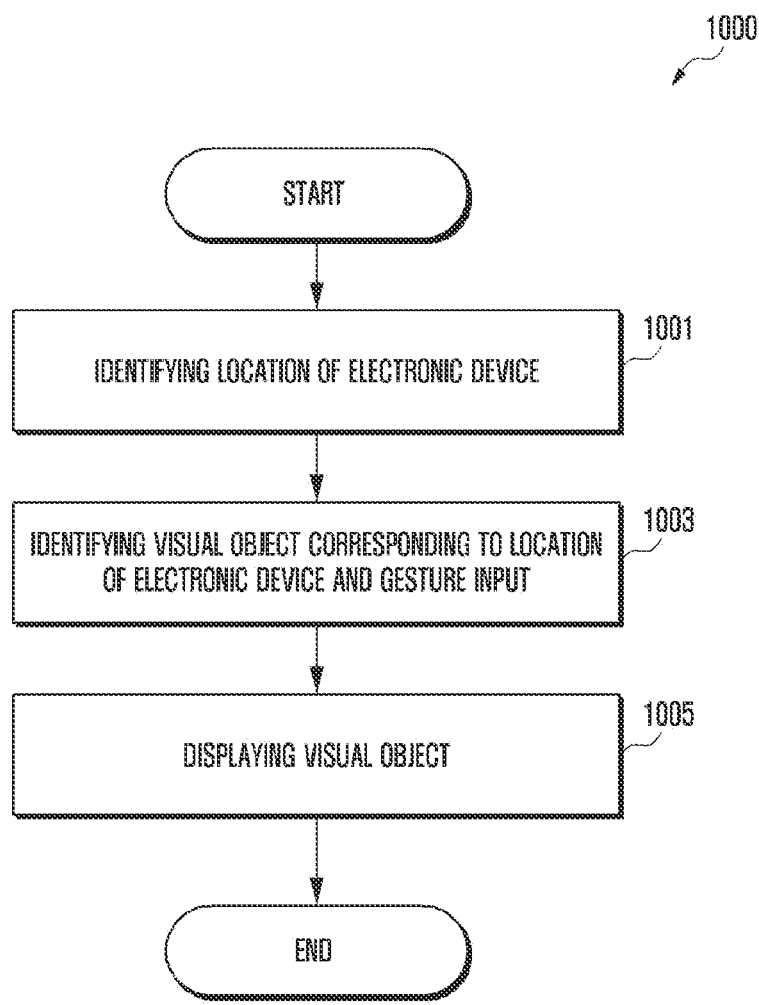
FIG. 10 illustrates a flowchart for providing a visual effect corresponding to a gesture input based on a location of an electronic device in an electronic device according to various embodiments of the present disclosure.

FIG. 10 is a flowchart 1000 for providing a visual effect corresponding to a gesture input based on a location of an electronic device in an electronic device according to various embodiments of the present disclosure. According to an embodiment, the operations in FIG. 10 may be detailed operations of operation 303 in FIG. 3. In the following embodiment, each operation may be sequentially performed, but is not necessarily performed sequentially. For example, the order of each operation may be changed, and at least two operations may be performed in parallel. For example, an electronic device in FIG. 10 may be the electronic device 101 in FIG. 1 or the electronic device 200 in FIG. 2. As an example, at least some constitutions of FIG. 10 will be described with reference to FIGS. 11A, 11B, 11C, and 11D.

Figure 11A:
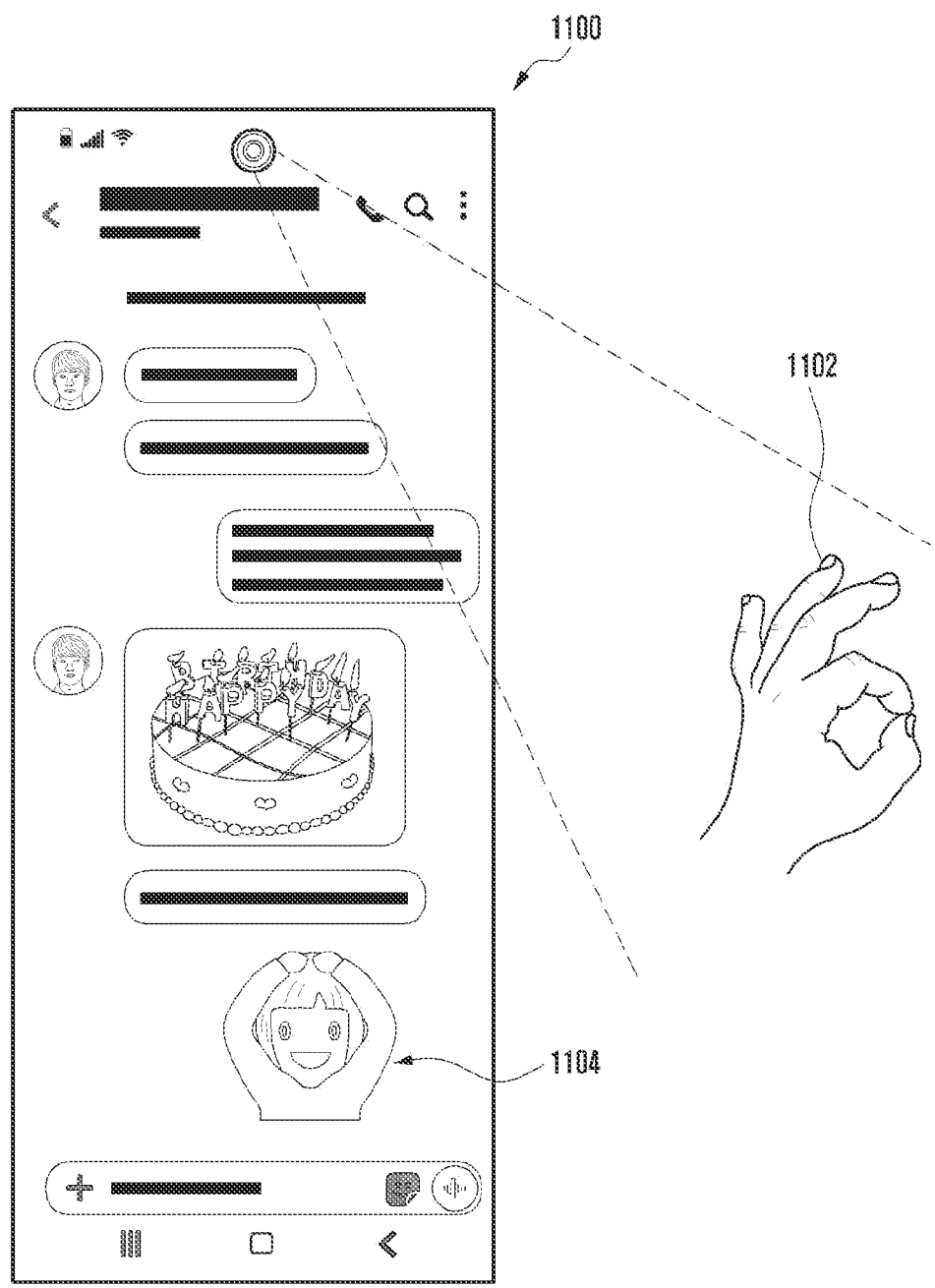
FIG. 11A illustrates an example of a screen constitution for displaying a visual object corresponding to a gesture input in an electronic device located at a first point according to various embodiments of the present disclosure.
Figure 11B:
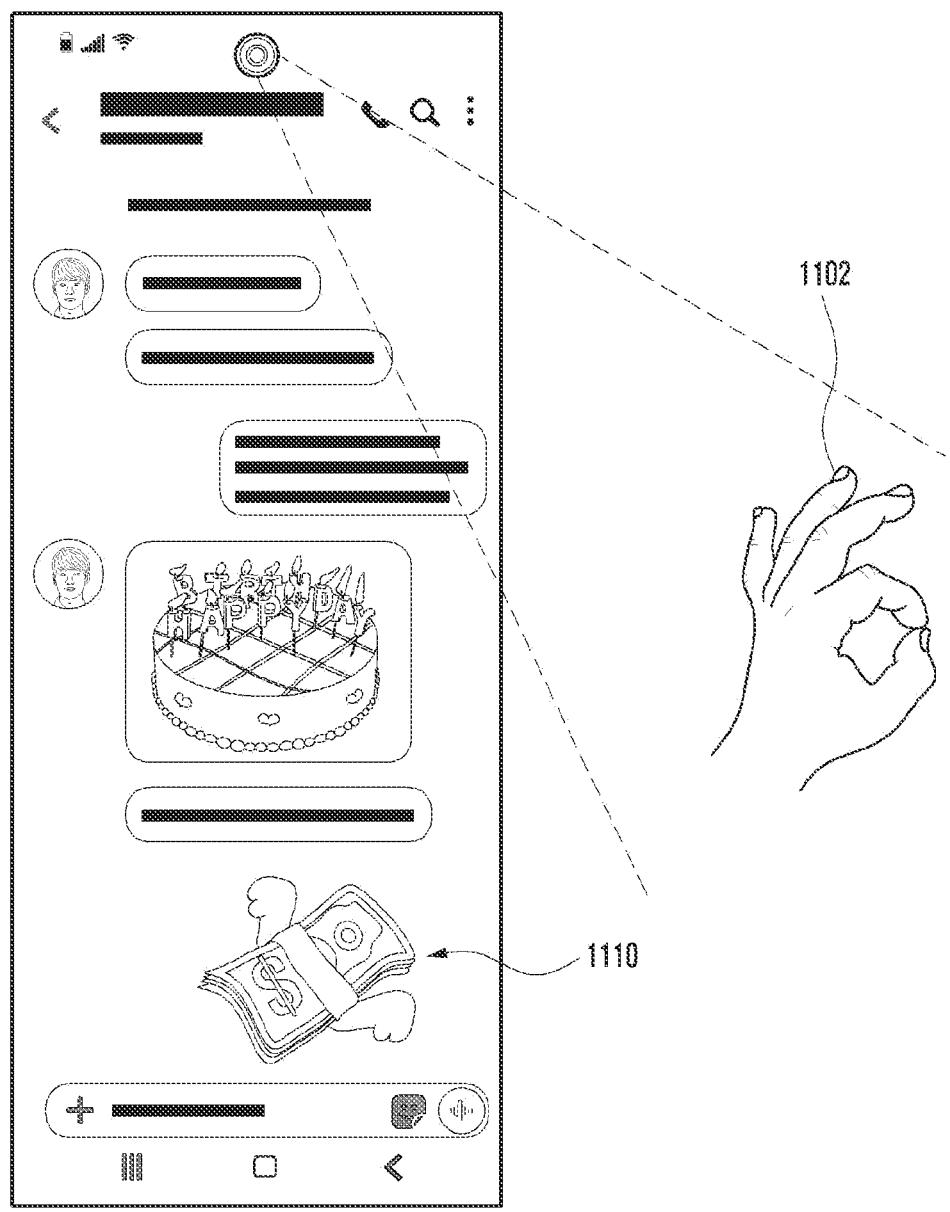
FIG. 11B illustrates an example of a screen constitution for displaying a visual object corresponding to a gesture input in an electronic device located at a second point according to various embodiments of the present disclosure.
Figure 11C:
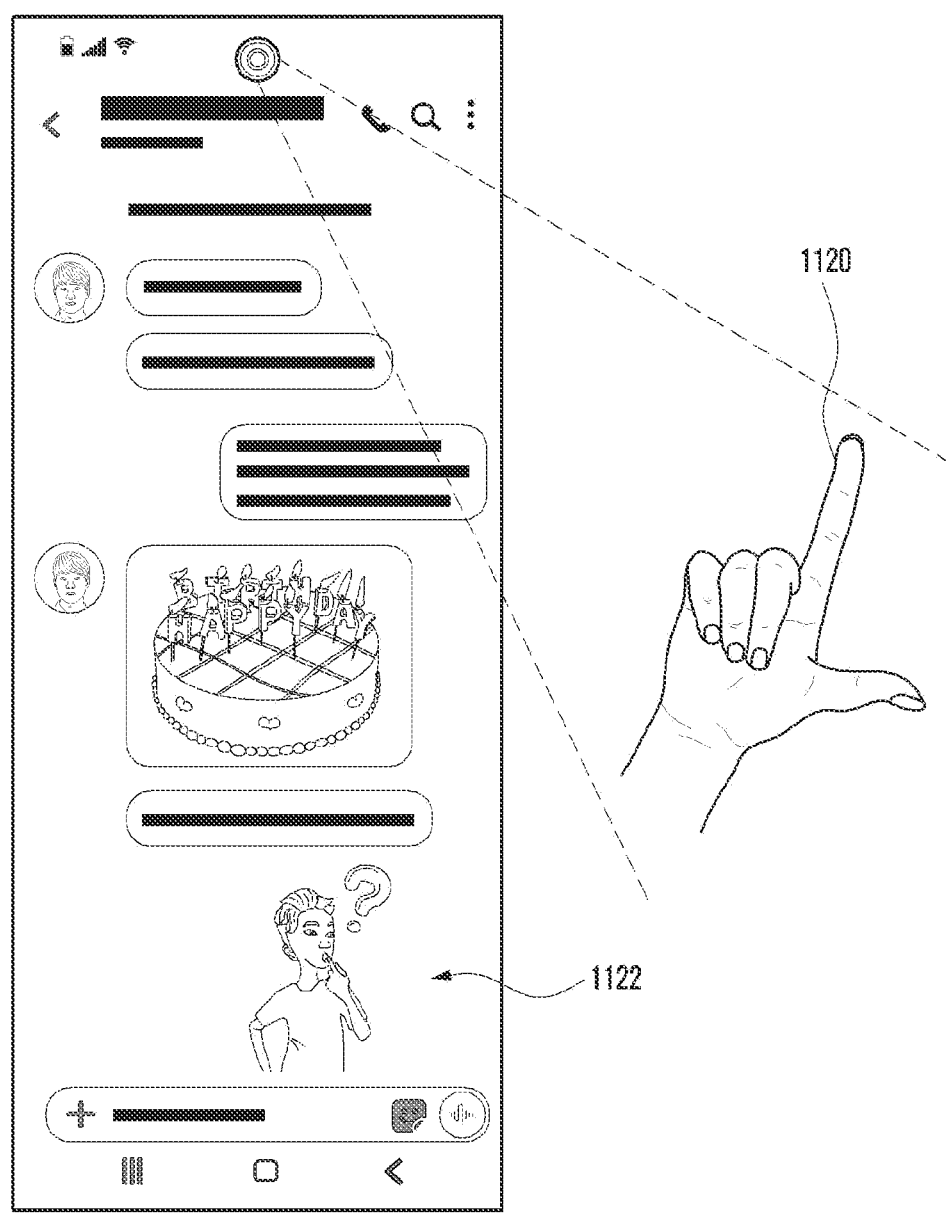
FIG. 11C illustrates another example of a screen constitution for displaying a visual object corresponding to a gesture input in an electronic device located at a first point according to various embodiments of the present disclosure.
Figure 11D:
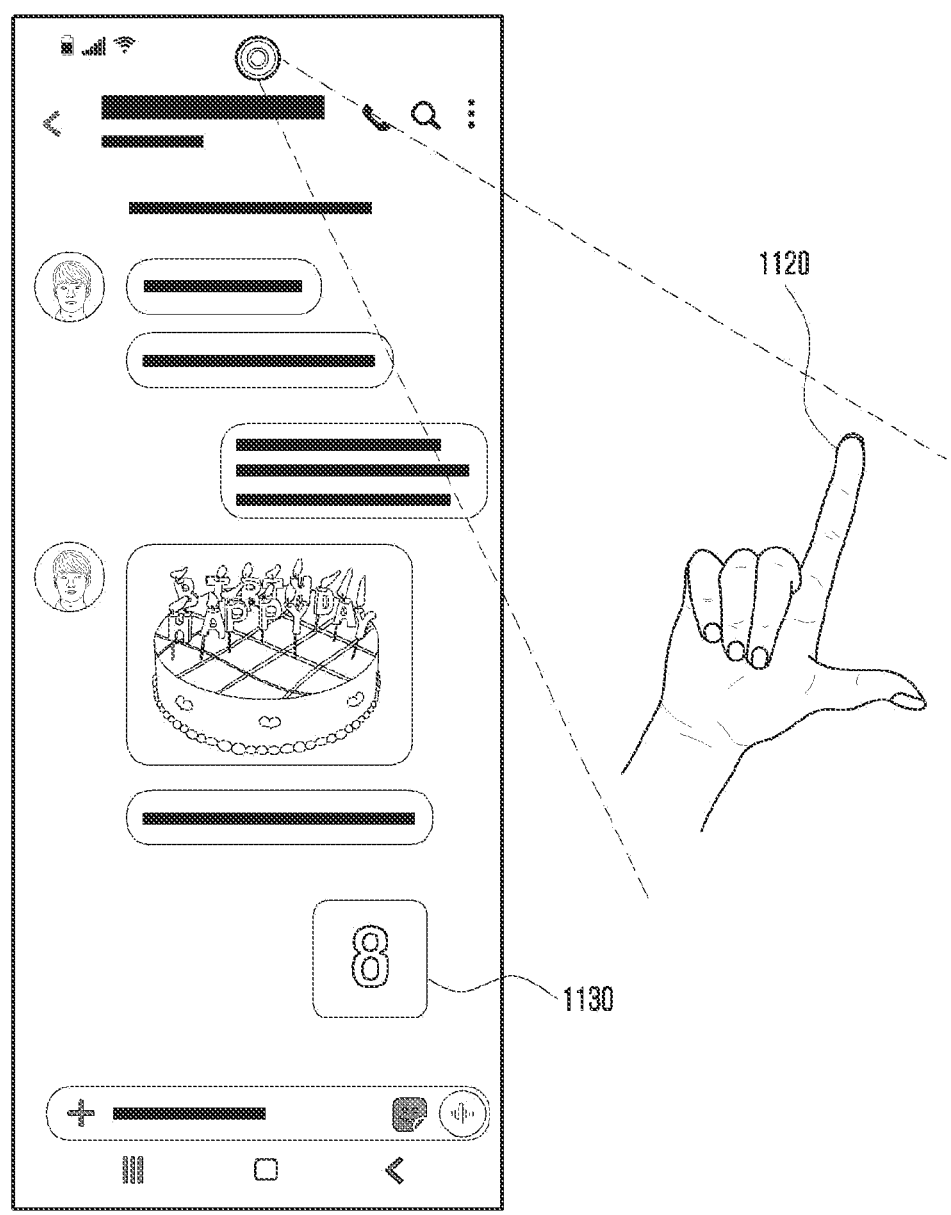
FIG. 11D illustrates another example of a screen constitution for displaying a visual object corresponding to a gesture input in an electronic device located at a second point according to various embodiments of the present disclosure.

FIG. 11A illustrates an example of a screen constitution for displaying a visual object corresponding to a gesture input in an electronic device located at a first point according to various embodiments of the present disclosure. FIG. 11B illustrates an example of a screen constitution for displaying a visual object corresponding to a gesture input in an electronic device located at a second point according to various embodiments of the present disclosure. FIG. 11C illustrates another example of a screen constitution for displaying a visual object corresponding to a gesture input in an electronic device located at a first point according to various embodiment of the present disclosure s. FIG. 11D illustrates another example of a screen constitution for displaying a visual object corresponding to a gesture input in an electronic device located at a second point according to various embodiments of the present disclosure.

With reference to FIG. 10, according to various embodiments, in providing a chat service, an electronic device (e.g., the processor 120 in FIG. 1 or the processor 210 in FIG. 2) may identify a location of the electronic device 200 in operation 1001 when sensing a gesture input through a sensor module (e.g., the sensor module 230)) (e.g., operation 301 in FIG. 3). For example, a location of the electronic device 200 may be identified based on at least one of a mobile country code (MCC), a global navigation satellite system (GNSS), a phone number, a carrier portability code (CPC), an international mobile equipment identity (IMEI), an international mobile subscriber identity (IMSI), a mobile network code (MNC), wireless fidelity (Wi-Fi), and a data network (e.g., an IP address).

According to various embodiments, an electronic device (e.g., the processor 120 or 210) may identify a visual object corresponding to a gesture input sensed through a sensor module (e.g., the sensor module 230) based on a location of the electronic device 200 in operation 1003. According to an embodiment, the processor 210 may sense a sixth gesture input 1102 through the sensor module 230 (e.g., a spatial sensor), as illustrated in FIGS. 11A and/or 11B, in providing a messenger service. For example, when the electronic device 200 is located at a first point (e.g., the United States), the processor 210 may identify a first visual object (e.g., OK icon) 1104 corresponding to the sixth gesture input 1102, as illustrated in FIG. 11A. For example, when the electronic device 200 is located at a second point (e.g., Korea), the processor 210 may identify a second visual object (e.g., money icon) 1110 corresponding to the sixth gesture input 1102 as illustrated in FIG. 11B.

According to an embodiment, the processor 210 may sense a seventh gesture input 1120 through the sensor module 230 (e.g., a spatial sensor) in providing a messenger service, as illustrated in FIG. 11C and/or FIG. 11D. For example, when the electronic device 200 is located at a first point (e.g., the United States), the processor 210 may identify a third visual object 1122 corresponding to the seventh gesture input 1120 as illustrated in FIG. 11C. For example, when the electronic device 200 is located at a third point (e.g., China), the processor 210 may generate a fourth visual object (e.g., 8 icon) 1130 corresponding to the seventh gesture input 1120 as illustrated in FIG. 11D.

According to various embodiments, an electronic device (e.g., the processor 120 or 210) may display a visual object corresponding to a location of the electronic device 200 and a gesture input in operation 1005. According to an embodiment, when the electronic device 200 is located at a first point (e.g., the United States), the processor 210 may control the display device 240 to display a first visual object (e.g., OK icon) 1104 corresponding to the sixth gesture input 1102 on at least a portion of a service screen 1100 of a messenger service, as illustrated in FIG. 11A. According to an embodiment, when the electronic device 200 is located at a second point (e.g., Korea), the processor 210 may control the display device 240 to display a second visual object (e.g., money icon) 1110 corresponding to the sixth gesture input 1102 on at least a portion of the service screen 1100 of a messenger service, as illustrated in FIG. 11B. According to an embodiment, when the electronic device 200 is located at a first point (e.g., the United States), the processor 210 may control the display device 240 to display the third visual object 1122 corresponding to the seventh gesture input 1120 on at least a portion of the service screen 1100 of a messenger service, as illustrated in FIG. 11C. According to an embodiment, when the electronic device 200 is located at a third point (e.g., China), the processor 210 may control the display device 240 to display the fourth visual object (e.g., 8 icon) 1130 corresponding to the seventh gesture input 1120 on at least a portion of the service screen 1100 of a messenger service, as illustrated in FIG. 11D.

Figure 12:
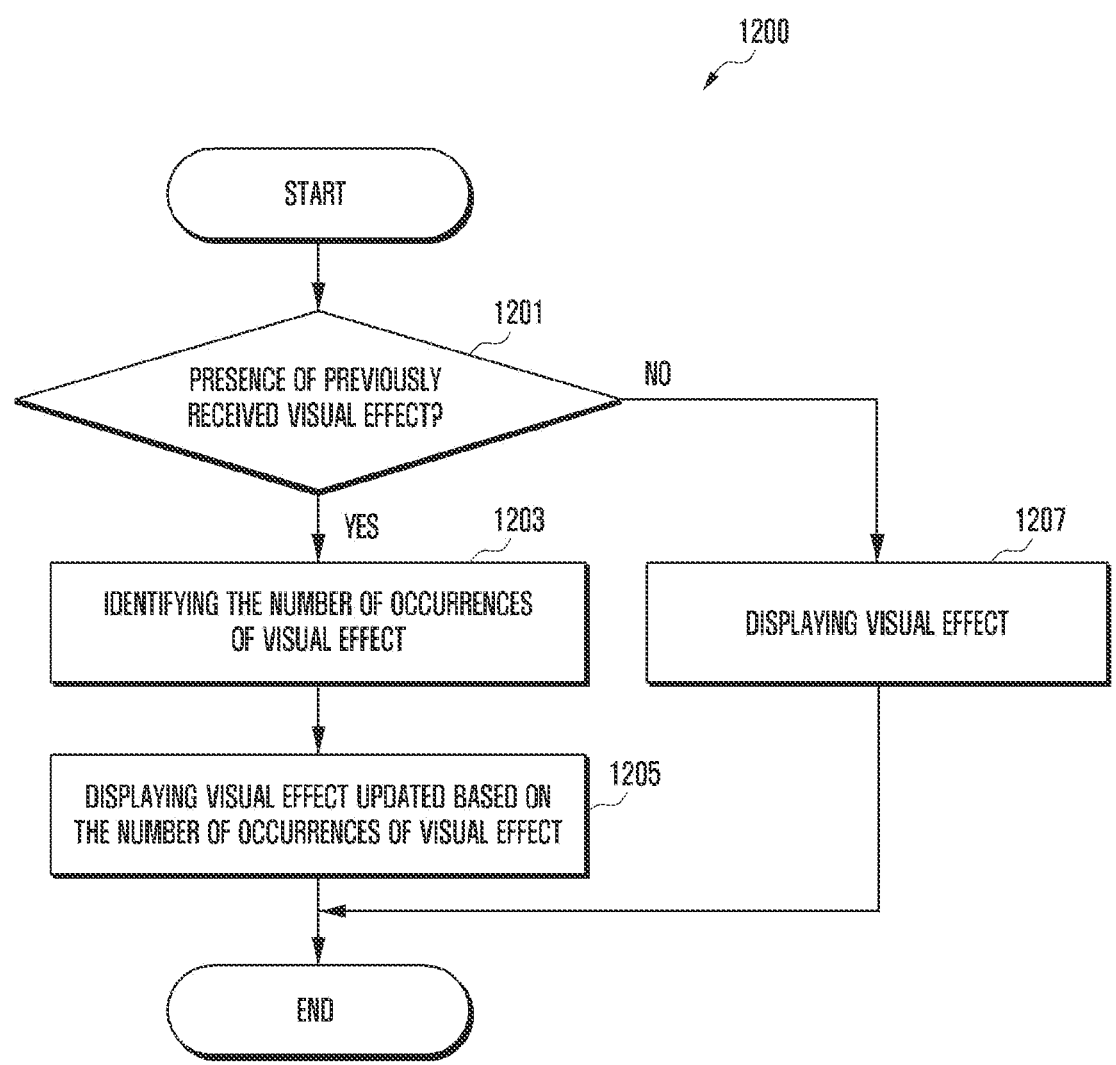
FIG. 12 illustrates a flowchart for updating a visual effect based on the number of occurrences of a visual effect in an electronic device according to various embodiments of the present disclosure.

FIG. 12 is a flowchart 1200 for updating a visual effect based on the number of occurrences of a visual effect in an electronic device according to various embodiments of the present disclosure. According to an embodiment, the operations in FIG. 12 may be detailed operations of operation 307 of FIG. 3. In the following embodiment, each operation may be sequentially performed, but is not necessarily performed sequentially. For example, the order of each operation may be changed, and at least two operations may be performed in parallel. For example, an electronic device in FIG. 12 may be the electronic device 101 in FIG. 1 or the electronic device 200 in FIG. 2.

With reference to FIG. 12, according to various embodiments, when receiving information related to a visual effect from another electronic device participating in a chat service (e.g., 'Yes' in operation 305 in FIG. 3), an electronic device (e.g., the processor 120 in FIG. 1 or the processor 210 in FIG. 2) may identify whether a corresponding visual effect has previously occurred in operation 1201.

According to various embodiments, when a visual effect received from another electronic device has previously occurred (e.g., 'Yes' in operation 1201), an electronic device (e.g., the processor 120 or 210) may identify the number of occurrences of a corresponding visual effect in operation 1203. For example, the number of occurrences of a visual effect may include at least one of the number of times a visual effect is generated in the electronic device 200 and/or the number of times a visual effect is received from another electronic device.

According to various embodiments, an electronic device (e.g., the processor 120 or 210) may display an updated visual effect based on the number of occurrences of a visual effect in operation 1205. According to an embodiment, an update of a visual effect may include a change in at least one of a type, shape, size, color, brightness, and movement (e.g., speed or direction) of a visual effect. For example, the processor 210 may control the display device 240 to display a visual effect by changing a size of a visual effect (e.g., a visual object) to a size corresponding to the number of occurrences of a visual effect. For example, the processor 210 may control the display device 240 to change and display a visual effect (e.g., a visual object) of a shape corresponding to the number of occurrences of a visual effect. For example, the processor 210 may control the display device 240 to change and display a moving speed of a visual effect (an animation effect) at a speed corresponding to the number of occurrences of the visual effect.

According to various embodiments, when a visual effect received from another electronic device has not previously occurred (e.g., 'No' in operation 1201), an electronic device (e.g., the processor 120 or 210) may display a visual effect received from another electronic device in operation 1207.

Figure 13:
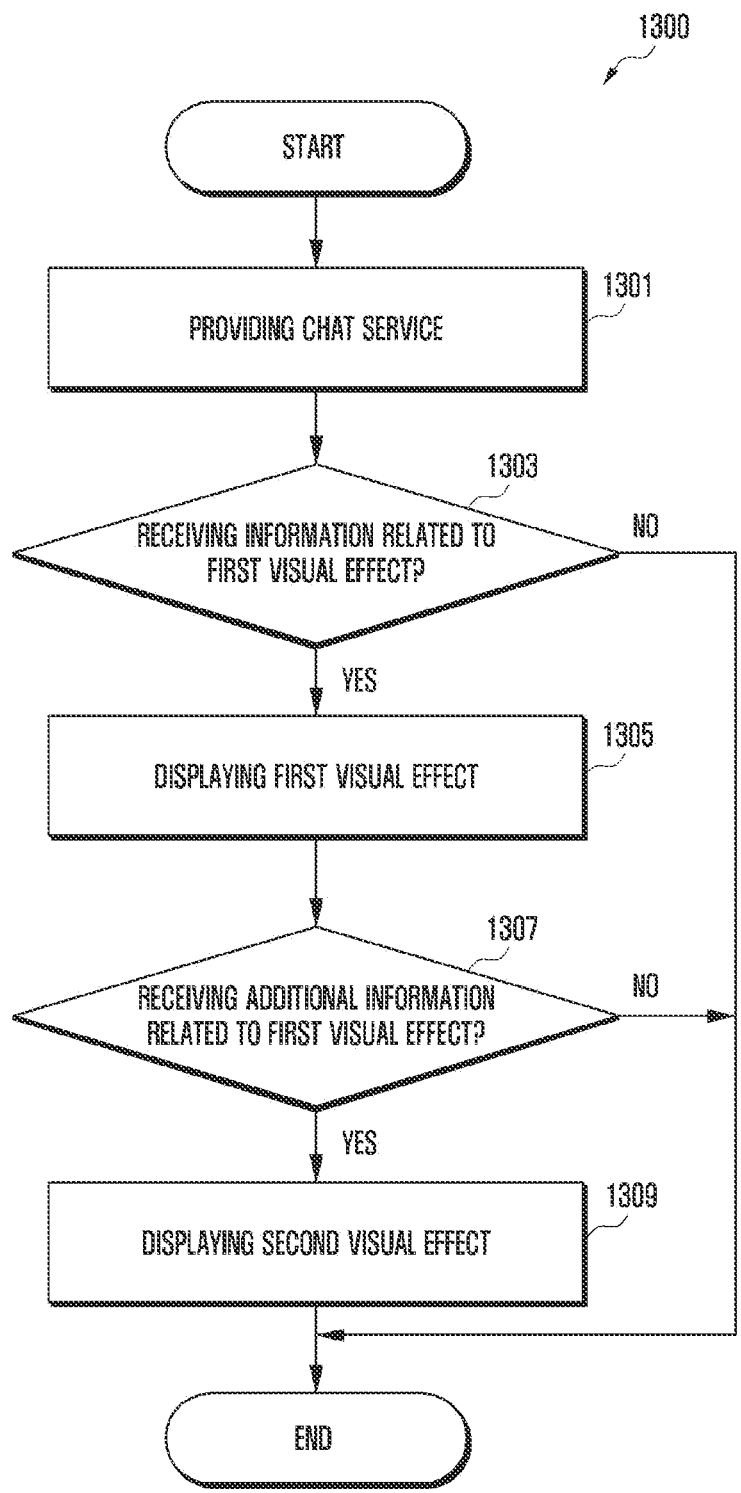
FIG. 13 illustrates a flowchart for updating a visual effect corresponding to a gesture input in an electronic device according to various embodiments of the present disclosure.

FIG. 13 is a flowchart 1300 for updating a visual effect corresponding to a gesture input in an electronic device according to various embodiments of the present disclosure. In the following embodiment, each operation may be sequentially performed, but is not necessarily performed sequentially. For example, the order of each operation may be changed, and at least two operations may be performed in parallel. For example, an electronic device in FIG. 13 may be the electronic device 101 in FIG. 1 or the electronic device 200 in FIG. 2.

With reference to FIG. 13, according to various embodiments, an electronic device (e.g., the processor 120 of FIG. 1 or the processor 210 of FIG. 2) may provide a chat service in operation 1301. According to an embodiment, the processor 210 may execute a communication application program corresponding to a user input when receiving the user input. The processor 210 may connects to a chat service corresponding to a communication application program to transmit and/or receive information to/from at least one other electronic device.

According to various embodiments, an electronic device (e.g., the processor 120 or 210) may check whether information related to a first visual effect has been received from another electronic device participating in a chat service in operation 1303. For example, information related to a first visual effect may be received through the wireless communication circuit 220.

According to various embodiments, an electronic device (e.g., the processor 120 or 210) may display a first visual effect received from another electronic device on at least a portion of a service screen for a chat service in operation 1305 when receiving information related to a first visual effect (e.g., 'Yes' in operation 1303). According to an embodiment, the processor 210 may receive information related to a first visual object (e.g., a first icon) 422 from another electronic device through the wireless communication circuit 220 in providing a messenger service. The processor 210 may control the display device 240 to display a first visual object (e.g., an icon) 422 on at least a portion of the service screen 420 for a messenger service, as illustrated in FIG. 4C.

According to various embodiments, in operation 1307, an electronic device (e.g., the processor 120 or 210) may identify whether information related to a first visual effect is additionally received from another electronic device (e.g., the electronic device 102 or 104 in FIG. 1) participating in a chat service.

According to various embodiments, an electronic device (e.g., the processor 120 or 210) may update a first visual effect displayed on a display device (e.g., the display device 240) to a second visual effect in operation 1309 when additionally receiving information related to a first visual effect from another electronic device (e.g., the electronic device 102 or 104 in FIG. 1) participating in a chat service (e.g., 'Yes' in operation 1307). For example, a second visual effect may include a visual effect in which at least one of a type (e.g., a second visual effect), size, and movement (e.g., speed or direction) of a first visual effect is updated. According to an embodiment, the processor 210 may control the display device 240 to change and display a first visual object (e.g., a first icon) 422 displayed on the display device 240 into a second visual object (e.g., a second icon) 430, as illustrated in FIG. 4D, when additionally receiving information related to a first visual effect through the wireless communication circuit 220.

Figure 14:
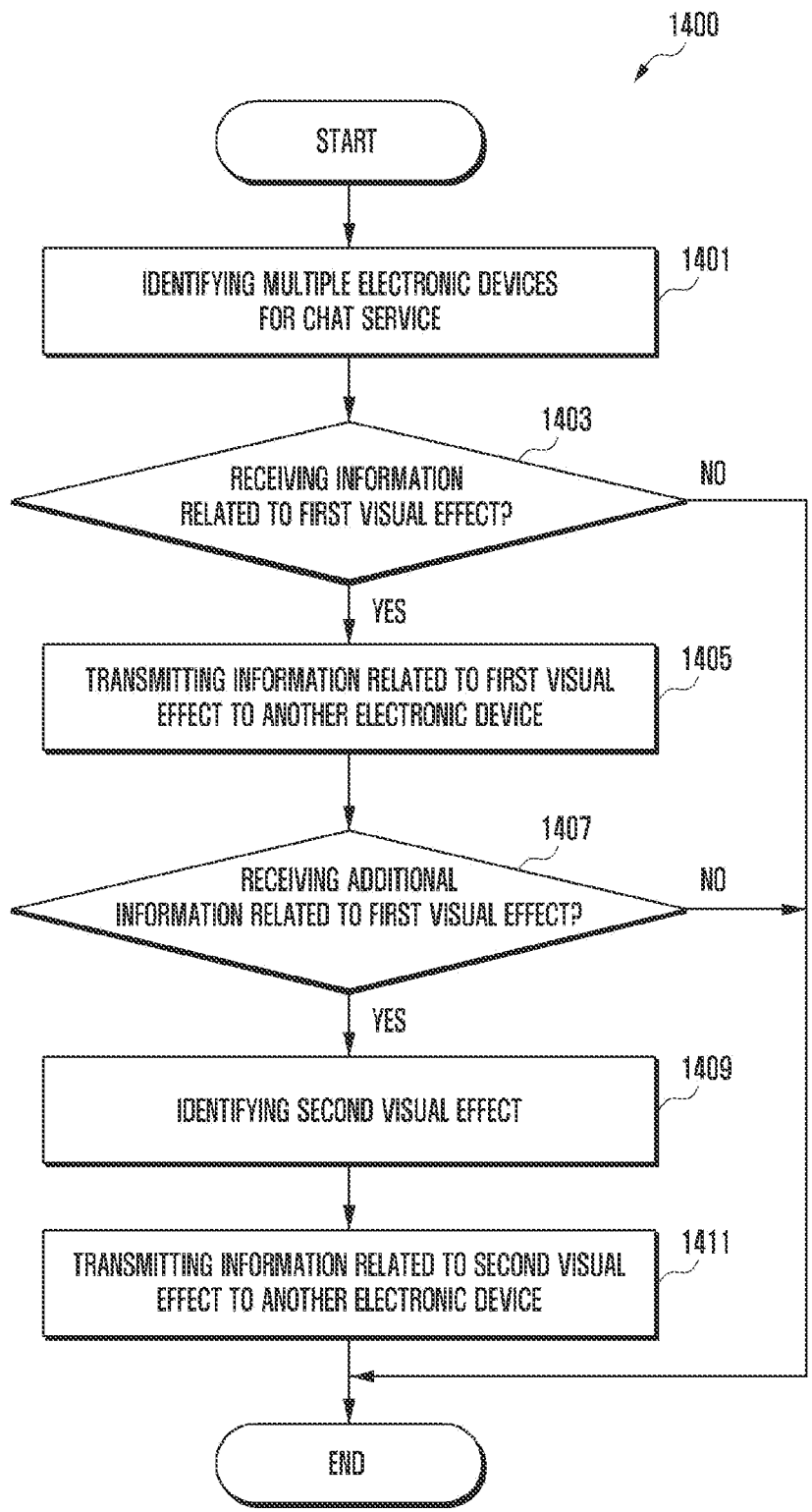
FIG. 14 illustrates a flowchart for transmitting a visual effect corresponding to a gesture input from an electronic device to another electronic device according to various embodiments of the present disclosure.

FIG. 14 is a flowchart 1400 for transmitting a visual effect corresponding to a gesture input from an electronic device to another electronic device according to various embodiments of the present disclosure. In the following embodiment, each operation may be sequentially performed, but is not necessarily performed sequentially. For example, the order of each operation may be changed, and at least two operations may be performed in parallel. For example, an electronic device in FIG. 14 may be the electronic device 101 or the server 108 in FIG. 1.

With reference to FIG. 14, according to various embodiments, an electronic device (e.g., the processor 120 in FIG. 1) may identify multiple other electronic devices participating in a chat service in operation 1401.

According to various embodiments, in operation 1403, an electronic device (e.g., the processor 120) may check whether information related to a first visual effect is received from a first electronic device among multiple other electronic devices participating in a chat service. For example, information related to a first visual effect may be received through the wireless communication module 192.

According to various embodiments, an electronic device (e.g., the processor 120) may transmit information related to a first visual effect to the other electronic devices other than a first electronic device among multiple other electronic devices participating in a chat service in operation 1405 when receiving information related to a first visual effect (e.g., 'Yes' in operation 1403).

According to various embodiments, in operation 1407, an electronic device (e.g., the processor 120) may identify whether information related to a first visual effect is additionally received from a second electronic device among multiple other electronic devices participating in a chat service.

According to various embodiments, an electronic device (e.g., the processor 120) may update a first visual effect to a second visual effect in operation 1409 when additionally receiving information related to a first visual effect (e.g., 'Yes' in operation 1407). For example, a second visual effect may include a visual effect updated based on the number of times a first visual effect is generated. For example, a second visual effect may include a visual effect in which at least one of a type (e.g., a second visual effect), size, and movement (e.g., speed or direction) of a first visual effect is updated.

According to various embodiments, an electronic device (e.g., the processor 120) may transmit information related to a second visual effect to multiple other electronic devices participating in a chat service in operation 1411. For example, the processor 120 may transmit information related to a second visual effect to a second electronic device that has additionally transmitted a first visual effect and the other electronic devices participating in a chat service.

Figure 15:
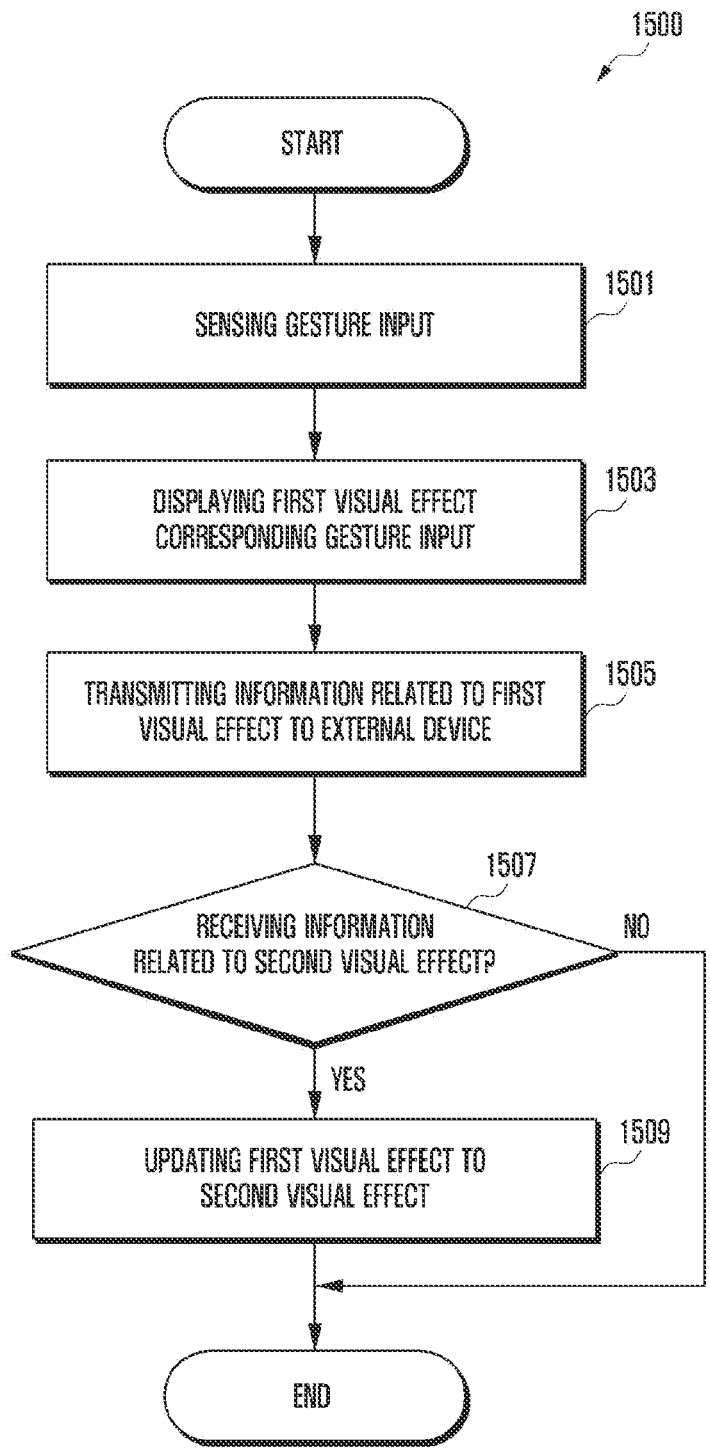
FIG. 15 illustrates a flowchart for displaying a visual effect in an electronic device according to various embodiments of the present disclosure.

FIG. 15 is a flowchart 1500 for displaying a visual effect in an electronic device according to various embodiments of the present disclosure. In the following embodiment, each operation may be sequentially performed, but is not necessarily performed sequentially. For example, the order of each operation may be changed, and at least two operations may be performed in parallel. For example, an electronic device in FIG. 15 may be the electronic device 101 in FIG. 1 or the electronic device 200 in FIG. 2.

With reference to FIG. 15, according to various embodiments, an electronic device (e.g., the processor 120 in FIG. 1 or the processor 210 in FIG. 2) may sense a gesture input in operation 1501 in providing a chat service. According to an embodiment, when the electronic device 200 provides a chat service with at least one other electronic device (e.g., the electronic device 102 or 104 in FIG. 1), the processor 210 may sense a movement (e.g., a gesture input) of an external object (e.g., a user's hand) in at least a partial area (e.g., actual space) within a reference distance from the electronic device 200 through the sensor module 230. For example, a chat service may include at least one of a messenger service and a video call.

According to various embodiments, an electronic device (e.g., the processor 120 or 210) may display a first visual effect corresponding to a gesture input in operation 1503. According to an embodiment, the processor 210 may control the display device 240 to display a first visual effect corresponding to a gesture input on at least a portion of a service screen for a chat service. For example, a first visual effect may be identified based on at least one of a type, shape, size, moving information (e.g., moving distance, moving speed, or moving direction) of a gesture input, a distance from the electronic device 200, the number of repetitions, and a location of the electronic device 200. For example, a distance from the electronic device 200 may include a distance between a gesture input location and the electronic device 200.

According to various embodiments, an electronic device (e.g., the processor 120 or 210) may transmit information related to a first visual effect to an external device (e.g., the server 108) that controls a chat service in operation 1505. According to an embodiment, the processor 210 may control the wireless communication circuit 220 to transmit information related to a first visual effect corresponding to a gesture input to an external device (e.g., the server 108 in FIG. 1).

According to various embodiments, in operation 1507, an electronic device (e.g., the processor 120 or 210) may check whether information related to a second visual effect is received from an external device that controls a chat service. For example, information related to a second visual effect may include information related to another visual effect for updating a first visual effect.

According to various embodiments, in operation 1509, an electronic device (e.g., the processor 120 or 210) may update a first visual effect displayed on a display device (e.g., the display device 240) to a second visual effect when receiving information related to a second visual effect from an external device (e.g., the server 108 in FIG. 1) that controls a chat service (e.g., 'Yes' in operation 1507).

According to various embodiments, a method for operating an electronic device (e.g., the electronic device 101 in FIG. 1 or the electronic device 200 in FIG. 2) may include operations of sensing a gesture input through the sensor module of the electronic device, displaying a first visual effect corresponding to the gesture input, and updating the first visual effect to a second visual effect when information related to the first visual effect is received from another electronic device.

According to various embodiments, the first visual effect may be configured based on at least one of a type of the gesture input, a shape of the gesture input, a moving distance of the gesture input, a moving speed of the gesture input, a moving direction of the gesture input, a distance between a location at which the gesture input is sensed and the electronic device, the number of repetitions of the gesture input, and a location of the electronic device.

According to various embodiments, the operation of displaying the first visual effect may include operations of selecting the first visual effect based on at least one of a location of the electronic device, a type of the gesture input, and a shape of the gesture input, configuring at least one of the size, location and moving information of the first visual effect based on at least one of a moving distance of the gesture input, a moving speed of the gesture input, a moving direction of the gesture input, a distance between a location at which the gesture input is sensed and the electronic device, and the number of repetitions of the gesture input, and displaying the first visual effect based on at least one of the size, location and moving information of the first visual effect.

According to various embodiments, the first visual effect may include at least one of displaying a visual object corresponding to the gesture input and setting a background screen corresponding to the gesture input.

According to various embodiments, the second visual effect may be configured based on the number of times the first visual effect is generated and/or the number of times information related to the first visual effect is received.

According to various embodiments, the operation of updating the second visual effect may include the operation of displaying the second visual effect in which at least one of a type, shape, size, color, brightness, and movement of the first visual effect is updated.

According to various embodiments, when multiple other electronic devices are connected to a messenger service to which the electronic device is connected, the operation of activating the sensor module may be further included.

According to various embodiments, when the gesture input is sensed through the sensor module, the operation of transmitting information related to the first visual effect to another electronic device may be further included.

Embodiments of the present disclosure as described in the present specification and drawings are merely presented as specific examples to easily explain the technical content according to the embodiment of the present disclosure and help the understanding of the embodiment of the present disclosure, and are not intended to limit the scope of the embodiments of the present disclosure. Therefore, in addition to the embodiments disclosed herein, all changes or modifications derived from the technical ideas of various embodiments of the present disclosure should be interpreted as being included in the scope of various embodiments of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a sensor;
   a wireless communication circuit;
   a display; and
   at least one processor operatively connected to the sensor, the wireless communication circuit, and the display,
   wherein the at least one processor is configured to:
   when the electronic device is connected to a plurality of other electronic devices through the wireless communication circuit, activate the sensor;
   sense a gesture input through the activated sensor;
   identify a first visual effect based on at least one of a distance between a location at which the gesture input is sensed and the electronic device, or a number of repetitions of the gesture input;
   display the identified first visual effect corresponding to the gesture input through the display;
   receive, from a first other electronic device among the plurality of other electronic devices through the wireless communication circuit, a first information related to the first visual effect;
   in response to receipt of the first information related to the first visual effect, change the first visual effect displayed on the display to a second visual effect different from the first visual effect;
   receive, from a second other electronic device among the plurality of other electronic devices through the wireless communication circuit, a second information related to the first visual effect; and
   in response to receipt of the second information related to the first visual effect, change the second visual effect displayed on the display to a third visual effect different from the first visual effect and the second visual effect.

2. The electronic device according to claim 1, wherein the at least one processor is further configured to display the first visual effect including at least one of:
   displaying a visual object corresponding to the gesture input; and
   setting a background screen corresponding to the gesture input.

3. The electronic device according to claim 1, wherein the at least one processor is further configured to display the second visual effect in which at least one of a type, shape, size, color, brightness, and movement of the first visual effect displayed on the display is updated when receiving the first information related to the first visual effect from the first other electronic device through the wireless communication circuit.

4. The electronic device according to claim 1, wherein the at least one processor is further configured to transmit the first information related to the first visual effect to the first other electronic device through the wireless communication circuit when sensing the gesture input through the sensor.

5. A method for operating an electronic device, comprising:
   when the electronic device is connected to a plurality of other electronic devices through a wireless communication circuit, activating a sensor of the electronic device;
   sensing a gesture input through the activated sensor;
   identifying a first visual effect based on at least one of a distance between a location at which the gesture input is sensed and the electronic device, or a number of repetitions of the gesture input;
   displaying the identified first visual effect corresponding to the gesture input;
   receiving from, a first other electronic device among the plurality of other electronic devices, a first information related to the first visual effect;
   in response to receiving the first information related to the first visual effect, changing the first visual effect to a second visual effect different from the first visual effect;
   receiving from, a second other electronic device among the plurality of other electronic devices, a second information related to the first visual effect; and
   in response to receiving the second information related to the first visual effect, changing the second visual effect to a third visual effect different from the first visual effect and the second visual effect.

6. The method according to claim 5, wherein the first visual effect includes at least one of displaying a visual object corresponding to the gesture input and configuring a background screen corresponding to the gesture input.

7. The method according to claim 5, wherein updating the second visual effect comprises displaying the second visual effect in which at least one of a type, shape, size, color, brightness and movement of the first visual effect is updated.

8. The method according to claim 5, further comprising transmitting the first information related to the first visual effect to the first other electronic device when the gesture input is sensed through the sensor.

9. A non-transitory computer readable medium containing instructions that when executed cause at least one processor of an electronic device to:
   when the electronic device is connected to a plurality of other electronic devices through a wireless communication circuit, activate a sensor of the electronic device;
   sense a gesture input through the activated sensor;
   identify a first visual effect based on at least one of a distance between a location at which the gesture input is sensed and the electronic device, or a number of repetitions of the gesture input;
   display the identified first visual effect corresponding to the gesture input;
   receive, from a first other electronic device among the plurality of other electronic devices, a first information related to the first visual effect;
   in response to receiving the first information related to the first visual effect, change the first visual effect to a second visual effect different from the first visual effect;
   receive from, a second other electronic device among the plurality of other electronic devices, a second information related to the first visual effect; and
   in response to receiving the second information related to the first visual effect, change the second visual effect to a third visual effect different from the first visual effect and the second visual effect.

10. The non-transitory computer readable medium of claim 9, wherein the instructions that when executed cause the at least one processor to display the first visual effect comprise instructions that when executed cause at least one processor to:

display a visual object corresponding to the gesture input; and set a background screen corresponding to the gesture input.

* * * * *